United States Patent [19]

Idesawa

[11] Patent Number: 4,494,633
[45] Date of Patent: Jan. 22, 1985

[54] AUTOMATIC BRAKING-GAP ADJUSTER SYSTEM FOR MECHANICAL DRUM BRAKES

[75] Inventor: Isao Idesawa, Nagano, Japan

[73] Assignee: Nisshin Kogyo Kabushiki Kaisha, Japan

[21] Appl. No.: 362,492

[22] Filed: Mar. 26, 1982

[30] Foreign Application Priority Data

| Mar. 31, 1981 | [JP] | Japan | 56-45514[U] |
| May 30, 1981 | [JP] | Japan | 56-80179[U] |
| Jul. 15, 1981 | [JP] | Japan | 56-110356 |
| Jul. 15, 1981 | [JP] | Japan | 56-105291[U] |
| Jul. 15, 1981 | [JP] | Japan | 56-105293[U] |
| Jul. 15, 1981 | [JP] | Japan | 56-105294[U] |
| Jul. 15, 1981 | [JP] | Japan | 56-105295[U] |
| Jul. 15, 1981 | [JP] | Japan | 56-105296[U] |
| Dec. 26, 1981 | [JP] | Japan | 56-193583[U] |

[51] Int. Cl.³ .................................................. F16D 65/56
[52] U.S. Cl. .............................. 188/329; 188/79.5 K; 188/196 BA; 188/330; 188/79.5 GC
[58] Field of Search ............... 188/79.5 GC, 79.5 K, 188/79.5 S, 79.5 GE, 79.5 GT, 79.5 R, 329, 330, 328, 327, 196 BA, 196 B, 79.5 SC, 79.5 SS, 339, 338, 332; 192/111 A, 93, 78

[56] References Cited

U.S. PATENT DOCUMENTS

| 2,064,103 | 12/1936 | Burdick | 188/329 |
| 2,351,114 | 6/1944 | Freeman | 188/330 |
| 2,852,106 | 9/1958 | Cull, Jr. et al. | 188/330 |
| 3,196,987 | 7/1965 | Moore et al. | 188/330 X |
| 4,394,892 | 7/1983 | Mizusawa et al. | 188/79.5 K X |

Primary Examiner—Douglas C. Butler
Attorney, Agent, or Firm—Cantor and Lessler

[57] ABSTRACT

An automatic braking-gap adjuster system for a mechanical drum brake which has a pair of brake shoes pivotally mounted at one end on a back plate. A cam member is located between the free ends of the brake shoes. The cam member, actuated through a brake arm, expands the brake shoes to urge them against the brake drum.

14 Claims, 36 Drawing Figures

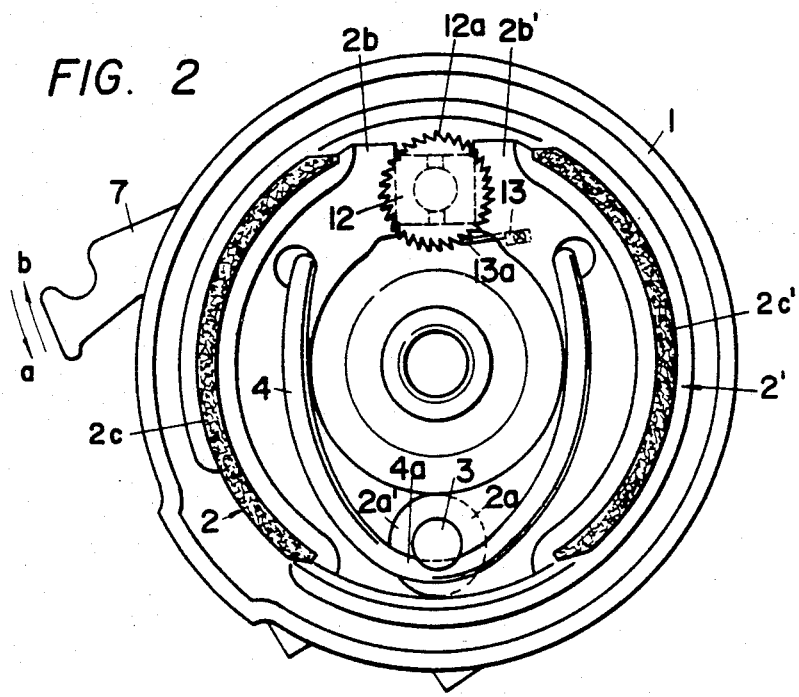
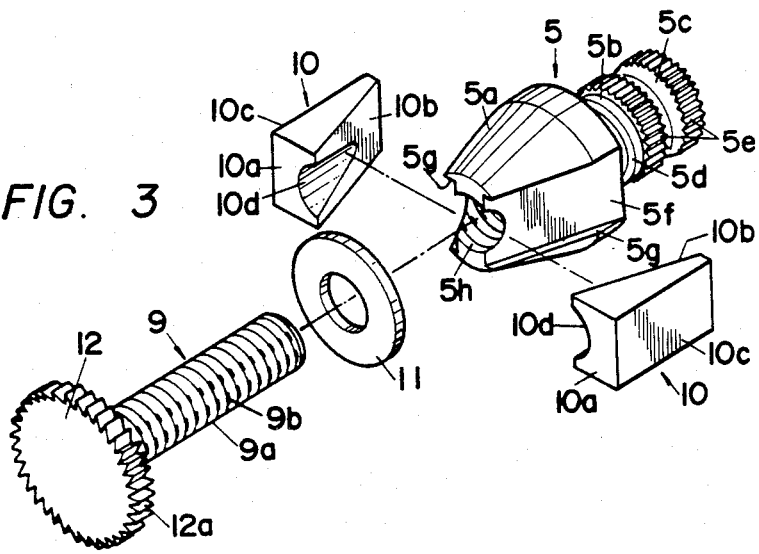

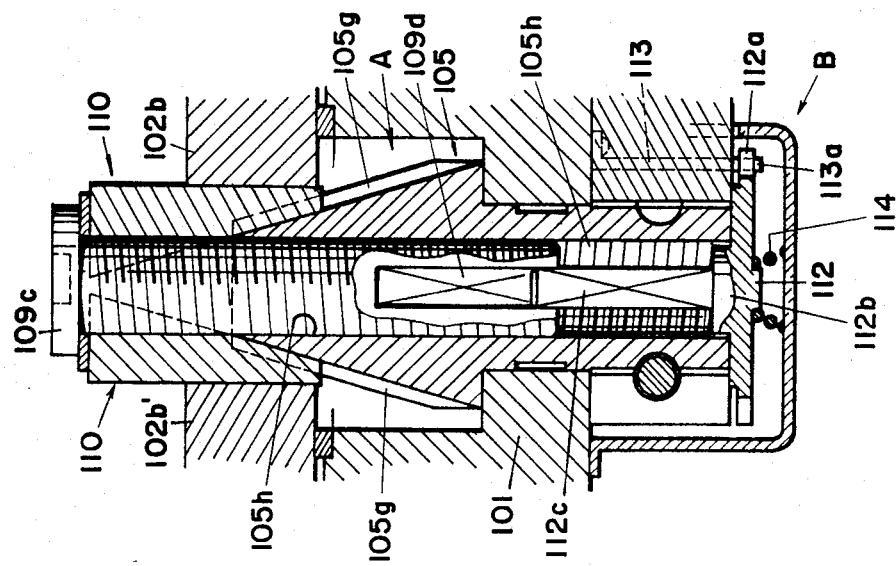
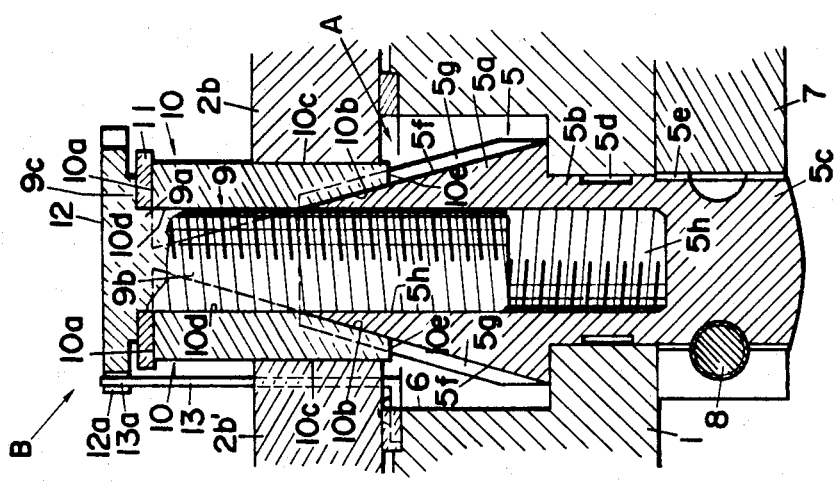

AUTOMATIC BRAKING-GAP ADJUSTER SYSTEM FOR MECHANICAL DRUM BRAKES

BACKGROUND OF THE INVENTION

The present invention relates to an automatic braking-gap adjuster system for a mechanical drum brake used with a light car etc., including a back plate, a pair of brake shoes each having one end pivotally supported thereon and a cam member interposed between both shoe web free ends of the shoes and extending through the back plate, said brake being designed to be put in operation by turning the cam member through a brake arm to expand the brake shoes and thereby urge them upon the inner periphery of a brake drum.

In the prior art automatic braking-gap adjuster system of such a type, a cam adapted to expand brake shoes by its rotation is sequentially regulated to a different angle of rotation with the progress of abrasion of linings to provide automatic adjustment of a braking-gap between the inner periphery of a brake drum and the surfaces of the linings. Accordingly, the amount of rotation of a brake arm needed for effecting sufficient braking increases with increases in the abrasion loss of the linings, leading to increases in the amount of rotation of the cam. This also results in increases in the stroke of a brake lever or pedal which, in turn, may cause a malfunction of the brake. A problem also arises when the angle of rotation of the cam departs from the upper limit of a normal range, since the brake may then operate insufficiently or not at all. Further, since the angle of rotation of the cam and hence the point of application thereof varies even in a normal range due to repeated adjsutment, difficulties may occasionally be encountered in keeping the operation of the brake constant depending upon the braking action of the brake arm.

The present invention provides solutions to the above-mentioned problems the prior art offers.

A main object of the present invention is therefore to provide an automatic braking-gap adjuster system for a mechanical drum brake, which always keeps a braking-gap constant in an automatic manner, maintains the angle of turning of a brake arm at a preset value even upon adjustment, is in stable and sure operation due to no change in the stroke of a brake lever or pedal, is simple in construction and is inexpensive to manufacture.

According to the present invention this object is achieved by provision of an automatic brake-gap adjuster system for mechanical drum brakes, comprising a pair of brake shoes, each having one end pivotally supported on a back plate and the other free end adapted to be expanded into engagement with the inner periphery of a brake drum; a cam member rotatably disposed through said back plate between said free ends of said pair of brake shoes and adapted to be rotated by a brake arm; cam collars adapted to take abutment onto said free ends of said brake shoes and mounted on said cam member in such a manner that said collars are rotatable with said cam member, slidable toward a cam shaft and movable in the expanding direction of said brake shoes; and an actuating member threaded into said cam member to take abutment onto the end faces of said collars, thereby moving said collars; and an adjusting member adapted to rotate said actuating member in response to the abrasion of said brake shoes, thereby threadedly moving said actuating member toward said cam shaft, whereby said cam collars are slidingly moved toward said cam shaft in the expanding direction of said brake shoes to expand said brake shoes, so that a brake-gap between the inner periphery of said brake drum and said brake shoes is adjusted.

Another object of the present invention is to provide an automatic brake-gap adjuster system for mechanical drum brakes, which is particularly applicable to a mechanical drum brake of small size by reducing the width of the cam portion of a cam member. The system improves the return properties of brake shoes upon release of braking, reliably transmits the rotational force of the cam member from cam collars engaged with shoe-engaging portion formed on the opposite surfaces of the cam member to shoe webs with no loss, and adjusts the stretching of a brake wire, which may take place due to repeated braking.

According to the present invention, this object is achieved by provision of the above-mentioned system, in which the cam portion of said cam member is provided with a pair of opposite surfaces which the shoe web free ends of said brake shoes face, said opposite surfaces including shoe-engaging portions which are axially provided with cam collar grooves having tapering bottoms at positions symmetrical about the center of said cam shaft, said cam collars taking abutment onto said free ends are slidably fitted into said grooves in such a manner that they extend to move apart said brake shoes, and said actuating member being threadedly moved by said adjusting mechanism to extend said cam collars in the expanding direction of said brake shoes.

A further object of the present invention is to provide an automatic brake-gap adjuster system for a mechanical drum brake, which prevents misarrangement of cam collars and is assembled with ease and efficiency.

According to the present invention, this object is achieved by provision of the above-mentioned system, in which said cam collars are formed of symmetrically polygonal plates each including shoe web-contacting surfaces and actuating member-contacting surfaces which intersect at right angles in symmetrical positions, an angle at which said shoe web-contacting surfaces intersect being acute, while an angle at which said actuating member-contacting surfaces intersect being obtuse.

A still further object of the present invention is to provide an automatic brake-gap adjuster system for mechanical drum brakes, which permits cam collars to expand brake shoes from the direction normal to a line drawn by connecting the center of a brake drum with the center of a cam shaft, thereby urging them against the drum brake, so as to surely receive braking torques and prevent local loads from being applied on cam collar grooves for supporting the cam collars, whereby the sliding portions of the collars and grooves are not damaged so that sliding movement of the cam collars is smooth and the efficiency of adjustment is improved.

According to the present invention, this object is achieved by provision of the above-mentioned system, in which the cam portion of said cam member is provided with cam collar grooves into which said cam collars are fitted, said grooves being designed to be inclined at a right angle with a line drawn by connecting the center of said cam shaft with the center of said brake drum during braking.

A still further object of the present invention is to provide an automatic brake-gap adjuster system for a mechanical drum brake, which prevents powders resulting from wearing, sand, etc. from entering between the head of an actuating member and the end of a cam portion and cam collar grooves to assure smooth rotation of the actuating member and smooth movement of cam collars in the adjusting direction for proper adjustment.

According to the present invention, this object is achieved by provision of the above-mentioned system, in which is further included a cam cover comprising a ceiling for covering the end of the cam portion of said cam member and the ends of said cam collars and skirts formed with cut-outs for permitting movement of said cam collars in the expanding direction of said brake shoes, said cover being mounted on the cam portion of said cam member in such a manner that it is slidable in response to threaded movement of said cam member, with its ceiling being interposed between the end of the cam portion and the head of said actuating member.

A still further object of the present invention is to provide an automatic brake-gap adjuster system for a mechanical drum brake, which prevents an actuating member which gives a push on cam collars for adjustment of a brake-gap from abutting upon the free ends of brake shoes upon completion of adjustment, thereby restraining said brake shoes against expansion, prevents an adjusting gear for rotating the actuating member from being pushed out a cam member due to threaded movement of the actuating member, so that an adjusting mechanism suffers no damage or failure, and, upon linings reaching the critical abrasion value, indicates the time for replacement of brake shoes by causing an increase in the stroke of a brake lever or pedal.

According to the present invention, this object is achieved by provision of the above-mentioned system, in which the cam portion of said cam member is provided with surfaces which the shoe web free ends of said brake shoes face, said surfaces having a length greater than the thickness of said free ends in the direction of said cam shaft, and in which the head of said actuating member is caused to abut upon the front end of said cam portion to place upon the movement of said actuating member a limitation which defines the critical value of brake-gap adjustment.

A still further object of the present invention is to provide an automatic brake-gap adjuster system for a mechanical drum brake, which is easy to locate a position at which resilient pawls mate with an adjusting gear as compared with the prior art system according to which a dust cover or back plate is clamped in place at two points, diminishes a chance of misarrangement of parts, and provides smooth and reliable adjustment due to less variations in the loads applied on the adjusting gear.

According to the present invention, this object is achieved by provision of the above-mentioned system, in which said adjusting mechanism comprises an adjusting gear formed integrally with or separately from said actuating member inserted into said cam member and an adjusting lever mounted on a stationary member and adapted to mate with said adjusting gear to rotate said gear in the adjusting direction in response to the abrasion of said brake shoes. and in which said adjusting lever is fitted over the cam shaft of said cam member so as to rotate said cam member, and has its end clamped on said back plate with a dust cover which covers said adjusting gear, and a resilient pawl is engaged with said adjusting gear in such a manner that it is rotatable in the adjusting direction.

A still further object of the present invention is to provide an automatic brake-gap adjuster system for a mechanical drum brake, which permits rotation of a feed pawl means with the cam shaft of a cam member with no loss, so that the feed means is properly fed for reliable adjustment of a brake-gap and constantly given braking, and allows easy and reliable manufacturing and assembling of the feed pawl means.

According to the present invention, this object is achieved by provision of the above-mentioned system, in which the cam shaft of said cam member is provided around its rear end with axially engaging portions, and a feed pawl means is inserted over the said cam shaft, having therein an opening the edge of which is formed with pieces to be engaged with said axially engaging portions, said feed pawl means being formed around its outer edge with resilient pawls adapted to mate with said adjusting gear, thereby providing rotational feeding of said adjusting gear in the adjusting direction.

A still further object of the present invention is to provide an automatic brake-gap adjuster system for a mechanical drum brake, which eliminates a disadvantage, as encountered in the prior art, that the degree of wearing of brake linings is not detected until an alarm is given when the abrasion of linings reaches the critical value, in other words, visually detects the degree of wearing of linings, and is simple in construction and inexpensive to manufacture.

According to the present invention, this object is achieved by provision of the above-mentioned system, in which said adjusting gear is formed with spiral guide means, said dust cover adapted to cover said adjusting gear is formed therein with a window, and an indicator means is slidably disposed within said window, the projection of said indicator means being slidably engaged with said spiral guide means, whereby said indicator means is slidable along said window in response to the rotation of said adjusting gear.

A still further object of the present invention is to provide an automatic brake-gap adjuster system for a mechanical drum brake, which prevents effectively an amount heat in braking from being transmitted to an adjusting mechansim, i.e., prevents the adjusting mechanism from being affected by said heat, by disposing the adjusting mechanism outside of a back plate and spaced far away from brake shoes and forming an air passage between the back plate and the adjusting mechanism, and prevents entrance of dust, sand and earth, mud, water, etc. into the adjusting mechanism, whereby reliable adjustment is assured for longer periods of time.

According to the present invention, this object is achieved by provision of an automatic brake-gap adjuster system for a mechanical drum brake, which comprises a pair of brake shoes disposed on the inside of a back plate; a mechanism for expansion of said brake shoes interposed between the shoe web free ends of said shoes and comprises of a cam member rotatably inserted through said plate, cam collars adapted to be slidable toward a cam shaft along said cam member and moved in the expanding direction of said brake shoes, and an actuating member threaded into said cam member and adapted to be moved toward said cam shaft to push said cam collars; and adjusting mechanism adapted to move said actuating member toward the end of said cam member extending out of said back plate in response to the abrasion of brake linings; and a covering mechanism adapted to close tightly said adjusting mechanism with an air passage between said back plate and said adjusting mechanism.

BRIEF DESCRIPTION OF THE DRAWINGS

These and other objects and features of the present invention will be apparent from a reading of the following detailed description with reference to the accompanying drawings, in which:

FIGS. 1 to 9 inclusive show one embodiment of the automatic brake-gap adjuster system for a mechanical drum brake according to the present invention;

FIG. 1 is a front view,

FIG. 2 a rear view,

FIG. 3 an exploded perspective view showing the cam member, actuating member, adjusting gear, cam collars and washer, FIG. 4 a sectional view taken along the line 4—4 of FIG. 1, FIG. 5 a sectional view similar to FIG. 4 and showing another embodiment of the adjusting mechanism, and FIGS. 6 to 9 are views showing another embodiment of the mechanism for expansion of brake shoes wherein FIG. 6 is a rear view, FIG. 7 an exploded perspective view showing the cam member, actuating member, cam collars and washer, FIG. 8 a sectional veiw taken along the line 8—8 of FIG. 6, and FIG. 9 an enlarged sectional view of parts;

FIG. 10 is a front view, FIG. 11 a rear view, FIG. 12 a sectional view taken along the line 12—12 of FIG. 11, FIG. 13 a plan view, FIG. 14 an exploded perspective view showing the cam member, cam collars, actuating member, washer, adjusting gear, adjusting lever and feed pawl means, FIG. 15 a sectional view of parts before adjustment, FIG. 16 a sectional view of parts after adjustment, FIG. 17 a sectional view of parts in which the brake wire is extended and the cam member reversed, FIG. 18 a partially enlarged sectional view showing another embodiment of the adjusting mechanism, FIGS. 19 and 20 show a view showing another embodiment of the mechanism for expansion of brake shoes wherein FIG. 19 is a plan view and FIG. 20 an exploded perspective view showing the cam member, cam collars and washer, FIGS. 21 to 26 show a further embodiment of the mechanism for expansion of brake shoes, wherein FIG. 21 a plan view, FIG. 22 a sectional view taken along the line 22—22 of FIG. 21, FIG. 23 a plan view, FIG. 24 a sectional view of parts before adjustment, FIG. 25 a sectional view of parts after adjustment and FIG. 26 a sectional view of parts showing the operation of the cam member, FIGS. 27 to 29 show a still further embodiment of the mechanism for expansion of brake shoes wherein FIG. 27 is a front view, FIG. 28 an exploded perspective view showing the cam member, cam collars, actuating member and cam cover, and FIG. 29 an sectional view showing the state in which the cam collars are extended in the expanding direction of brake shoes for adjustment of a brake-gap, and FIG. 30 shows a still further embodiment of the the mechansim for expansion of brake shoes;

FIG. 31 is a front view, FIG. 32 a sectional view taken along the line 32—32 of FIG. 31, FIG. 33 a sectional view taken along the line 33—33 of FIG. 32, FIG. 34 a sectional view taken along the line 34—34 of FIG. 33, and FIGS. 35 and 36 show another embodiment of the indicator means wherein, FIG. 35 is a front view and FIG. 36 a sectional view taken along the line 36—36 of FIG. 35.

Figure 1:
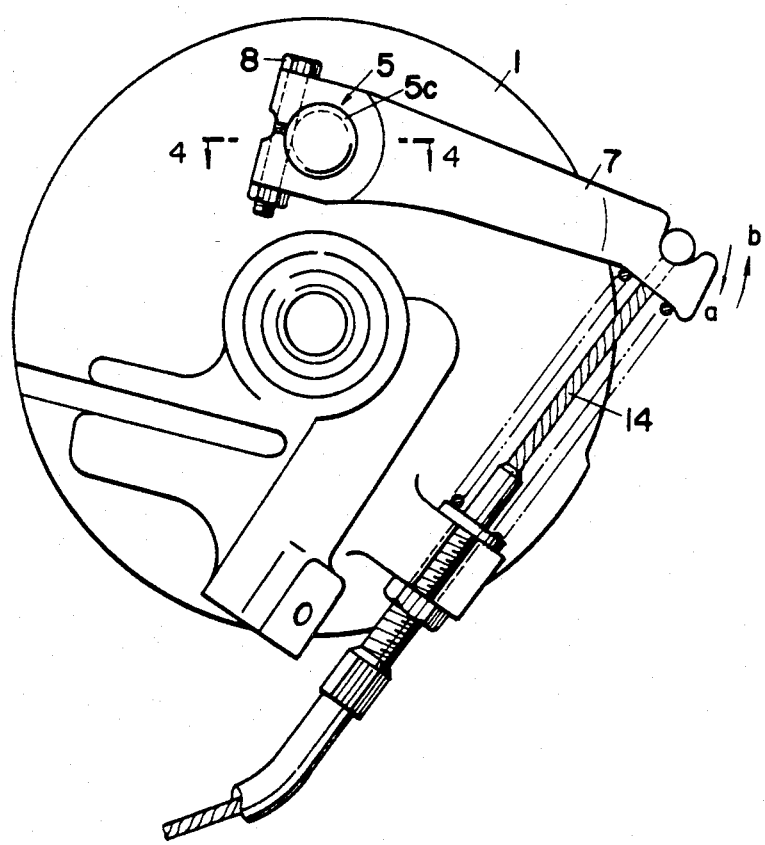

One embodiment of the present invention will now be explained with reference to FIGS. 1 to 4 inclusive.

A back plate 1 is provided on its inside with a pair of brake shoes 2, 2' each having one end 2a, 2a' pivotally supported by an anchor pin 3. The brake shoes are always biased toward each other by a substantially U-shaped shoe return spring 4 having its intermediate portion 4a supported by the anchor pin 3. Between the shoe web free ends 2b and 2b of shoes 2 and 2' there is provided a mechanism A for expansion of shoes 2 and 2'. This mechanism A is arranged as follows.

A cam member 5 comprises a cam portion 5a, a mounting shaft 5b and a serrated shaft 5c. The cam portion 5a is fitted into a recession 6 in the back plate 1 between the free ends 2b and 2b' of shoes 2 and 2'. The mounting shaft 5b is rotatably mounted on the back plate 1, and has a reservoir 5d in which a given amount of grease is filled for smooth rotation of the cam member 5. A brake arm 7 for rotating the cam member 5 mates with serrations 5e of the serrated shaft 5c projecting out of the back plate 1, and fixed in place by means of a clamp bolt 8.

The cam portion 5a of member 5 is provided in both its sides facing the free ends 2b and 2b' of shoes 2 and 2' with guide grooves 5g each having a surface 5f tapering toward its end. The cam member 5 has therein a bore extending from its cam portion 5a to its shaft 5b which bore is axially formed with a right-hand female thread 5h.

An actuating member 9 includes a shaft 9a having therearound a right-hand male thread 9b which mates with the female thread 5h of member 5, and has a head 9c which is to take abutment onto the front ends 10a of a pair of cam collars 10 through a washer 11, said collars being fitted into the guide grooves 5g. Each collar 10 has its inside tapering surface 10b abutting onto the tapering surface 5f of groove 5g, and its outside straight surface 10c abutting onto the free ends 2b and 2b' of shoes 2 and 2'. The collars 10 rotate with the cam member 5, and are forcedly slid in the axial direction of the cam shaft by threaded insertion of the actuating member 9 to expand the brake shoes 2 and 2'. Each collar 10 is provided on its inside with a play 10d for the shart 9 of member 9, thus assuring the support of collars 10 during their extension and rendering the threaded insertion of member 9.

A mechanism B for adjusting a braking-gap in response to the abrasion of brake linings is disposed inside of the back plate 1, and has the following arrangement.

An adjusting gear 12 is formed on the head 9c of the actuating member 9 as an integral piece. Rotation of this gear causes threaded movement of member 9 toward the cam shaft. A stopper 13 fixed to the back plate 1 includes a resilient pawl 13a which is engaged with the gear portion 12a of gear 12 to allow the rotation of gear 12 in the non-adjusting direction alone.

In what follows, reference will now be made to the operation of the adjuster system according to the foregoing embodiment.

Upon putting on the brake by operation of a brake lever or pedal, the brake arm 7 is rotated through a brake wire 14 in the direction indicated by an arrow a in FIG. 1 or 2 and, with rotation of this arm, the cam member 5 and the cam collars 10 engaging with that member are rotated in one piece in the counterclockwise direction in FIG. 2, thereby to force open the free ends 2b, 2b' of the brake shoes 2, 2'. The brake shoes 2, 2' are thus moved apart against the action of the shoe return spring 4 so that brake linings 2c, 2c' tightly abut upon the inner periphery of a brake drum (not illustrated).

The cam member 5, the cam collars 10, the adjusting gear 12 and the actuating member 9 are then rotated in one piece with rotation of the brake arm 7. However, the angle of rotation of the brake arm is restrained to a range over which the resilient pawl 13a of stopper 13 slides on the incline of the same tooth of the gear portion 12a of of the adjusting gear 12, so that there is no possibility that the resilient pawl 13a may cause rotation of the adjusting gear 12.

Upon release of braking, the brake shoes 2, 2' are restored to their initial positions by the action of the shoe return spring 4 and, correspondingly, the cam member 5, the adjusting gear 12 and the actuating member 9 are rotated in one piece in the clockwise direction to their initial positions.

If the brake linings 2c, 2c' wear away due to braking to such an extent that there is a braking-gap exceeding a preset value between the inner periphery of the brake drum and the surfaces of the linings 2c, 2c', then there is an increase in the amount of rotation of the cam member 5, the cam collars 10, the adjusting gear 12 and the actuating member 9 which rotate in one piece during braking. However, the rotation of gear 12 is limited by the resilient pawl 13a of the stopper 13, while both the cam member 5 and the collars 10 turn in proportion to said increase in the braking-gap.

In other words, the adjusting gear 12 is not permitted to rotate by the same amount as that of rotation of the brake arm 7, which corresponds to said increase in the braking-gap, by the resilient pawl 13a of the stopper 13, so that it rotates relative to the cam member 5 in the clockwise direction in FIG. 2. As a result, the actuating member 9 integrally formed with the adjusting gear 12 is threadedly inserted downwardly through the cam member 5, whereby the cam collars 10 are slidingly moved along the grooves 5g toward the back plate 1 by the head 9c of member 9. This causes that the free ends 2b, 2b' of shoes 2, 2' are moved apart to regulate the gap between the inner periphery of the brake drum and the surfaces of linines 2c, 2c'.

Release of braking then causes integral rotation of the brake arm 7, the cam collars 10, the cam member 5, the adjusting gear 12 and the actuating member 9 in the direction indicated by an arrow b in FIG. 1 or 2. The resilient pawl 13a of stopper 13 goes over one tooth of gear 12 and mates with the next tooth. The pawl thus returns to its initial position.

Accordingly, as the linings 2c, 2c' wear off, the resilient pawl 13a of stopper 13 mates in sequence with the teeth of the gear portion 12a of gear 12, while the actuating member 9 rotates in the clockwise direction and enters threadedly the cam member 5, so that the brake-gap is automatically adjusted until the end of actuating member 9 abuts onto the bottom of the female thread 5h of the cam member 5, or the rear ends 10e of the collars 10 abut onto the bottom of the recession 6.

When an excessive braking force is loaded upon the brake arm 7 during braking, i.e., when the brake shoes 2, 2' are engaged with the inner periphery of the brake drum and, thereafter, the brake arm 7 is subjected to an external force sufficient to cause deformation of the drum, such a force is offset due to the elastic deformation of the resilient pawl 13a of stopper 13 without shifting the position at which said pawl mates with the teeth of the gear portion 12a of gear 12. As such an excessive braking force decreases, the adjusting gear 12 is restored to its original position, this resulting in effective preventing of any over-adjustment.

According to the ivnentive system, a brake-gap is always kept constant in the initial position of the brake arm, and the cam collars can be engaged with the brake shoes at the same position even upon adjustment. In addition, the angle of pivotal movement of the brake arm is always maintained at a given value during braking with no change in the stroke of the brake lever or pedal, so that a driver can always put on the brakes with the same sense. The present system is also free from such disadvantages of the prior art that, as the linings wear away, there is a change in the angle of the cam member so that the point of application of the cam member shifts, which results in instable braking even if the brake arm is manipulated in a normal manner. There is also no fear that the brakes are unsatisfactorily put on due to the deviation of the angle of rotation of the cam member from a normal range.

FIG. 5 shows another embodiment of the adjusting mechanism B. According to this embodiment, the adjusting mechanism B is disposed outside of a back plate 101, and an actuating member 109 is provided apart from an adjusting gear 112. The actuating member 9 has in its rear end a slot 109d which is in threaded engagement with a right-hand female thread 105h formed through a cam member 105. The shaft 112b of gear 112 is provided with a projection which extends by the same distance as the critical abrasion length of brake linings. The adjusting gear 112 is rotatably mounted on the cam member 105 by allowing its projection 112c to come in engagement with the slot 109d in the actuating member 109 from the side of a brake arm 107, and supported by a spring 114. A stopper 113 is fixed to the back plate 101 located on the side of arm 107 with its resilient pawl 113a being in engagement with the gear portion 112a of gear 112.

As the brake linings wear away due to the pivotal movement of arm 107, the resilient pawl 113a of stopper 113 mates in sequence with the teeth of the gear portion 112a so that the adjusting gear 112 rotates in the same manner as in the first embodiment. The actuating member 109 is then relatively rotated in the clockwise direction, and threadedly inserted into the cam member 105. In this case, the cam collars 110 is moved toward the back plate 101 by the head 109c of member 109, and slid along the guide grooves 105g of member 105 to expand the free ends 102b, 102b' of the brake shoes, whereby the brake-gap between the inner periphery of the brake drum and the surfaces of the brake linings is adjusted.

FIGS. 6 to 9 inclusive show another embodiment of the mechanism A for expansion of brake shoes.

This embodiment is designed to increase the width of cam collars 210, 210 to take abutment onto the free ends of brake shoes 202, 202', as measured in the direction normal to the cam shaft, without increasing the diameter of the cam portion 205a of a cam member 205.

With the drum brake in which the cam member 205 is interposed between the free ends 202b and 202b' of a pair of brake shoes 202 and 202', it is required that the width of cam collars 210 and 210 in the direction normal to the cam shaft be increased to attain proper braking forces, since the brake shoes 202, 202' are moved apart through the cam collars 210, 210 by rotation of the cam member 205. However, increases in the width of collars 210, 210 result in increases in the size of the cam member 205 by which the cam collars 210, 210 are rotated and slidably supported. This places limitations on an allowable space, since the cam member interferes with the inner periphery of the brake drum or an axle.

More specifically, this embodiment is designed to render the width of cam collars most suitable for use in a limited space. According to this embodiment, it is possible to prevent rattling or rotational losses due to the abrasion of the cam member 205 and the cam collars 210, 210 during braking, and provide smooth returing of the cam member 205 upon release of braking.

This embodiment will now be explained in great detail. The cam portion 205a of member 205 is provided with tapering guide concavity and convexity on both its sides facing the free ends 202b, 202b' of shoes 202,202'. Each guide taper comprises a section 205k of wider width, guide sections 205i, 205i located on both its sides, along which the collars 210, 210 are slid, and locating sections 205j, 205j for holding the collars in the direction normal to the cam shaft. The cam collars 210, 210 are also provided with tapering guide convexity and concavity in association with the guide tapers of the cam portion 205a. Each guide taper comprises a section 210g of larger width, guide sections 210e, 210e defined on both its sides, which are in sliding engagement with the guide sections 205i, 205i of the cam portion 205a, and side walls 210f, 210f which are in abutting engagement with the locating section 205j, 205j of the cam portion 205a, said section 210g being formed with plays 210d, 210d for the actuating member 209.

The cam portion 205a and collars 210, 210 are engaged with each other at their guide sections 205i, 205i and 210e, 210e through gaps c between the section 205k of the cam portion 205a and the sections 210g, 210g of the cam collars 210, 210. This assures that the width $l_1$ of collars 210, 210 in the direction normal to the cam shaft reaches the maximum value within the diameter $l_2$ of the cam portion 205a.

Accordingly, the rotational force of the cam member 205 can properly be transmitted to the cam collars 210, 210 with no loss. Even when repeated braking allows the cam collars 210, 210 to force open the shoe web free ends 202b, 202b' of shoes 202, 202', the corners of the cam portion 205a does not wear off, since the width $l_1$ of collars 210, 210 is within the diameter $l_2$ of portion 205a. Thus, neither rattling nor operational losses of the brake lever are incurred.

In addition, the points at which the cam collars 210, 210 in engagement with the cam portion 205a abut upon the shoe web free ends 202b, 202b' of shoes 202, 202 are defined outside of the cam portion 205a in the radial direction. This helps reduce the loads required for expansion of the brake shoes 202, 202', which results in smooth operation, and, upon release of braking, easy and smooth returning of the cam member 205 to its initial position under the action of a return spring 204. The cam portion 205a of member 205 does not interfere with the axle or the the inner periphery of the brake drum, since the width of collars 210, 210 can be selected from the most efficient ranges within a limited space between the free ends 212b and 212b' with no need of increasing the diameter of the cam portion 205a. In addition, the length at which the free ends 202b, 202 b' is in contact with the collars 210, 210 makes contribution to stable adjustment, since the thickness $l_3$ of ends 202b, 202b' is always fixed within the width of collars 210, 210, as measured in the direction of the cam shaft.

Another embodiment of the automatic braking-gap adjuster system for a mechanical drum brake according to the present invention will now be explained with reference to FIGS. 10 to 17 inclusive.

A back plate 1 is provided on its inside with a pair of brake shoes 2, 2' each having one end 2a, 2a' pivotally supported by an anchor pin 3. The brake shoes are always biased toward each other by a substantially U-shaped shoe return spring 4 having its intermediate portion 4a supported by the anchor pin 3. A mechanism A for expansion of brake shoes includes a cam member 5 comprising a cam portion 5a of larger diameter, a mounting shaft 5b and a serrated shaft 5c. The cam member 5 is inserted through the back plate 1 via a washer 6 between the shoe web free ends 2b and 2b' of shoes 2 and 2'. The mounting shaft 5b is rotatably mounted on the back plate 1 with the cam portion 5a being opposed to both the shoe web free ends 2b and 2b'. The mounting shaft 5b has a reservoir 5d in which a given amount of grease is filled for smooth rotation of the cam member 5. A brake arm 7 is fixed to the serrated shaft 5c of the cam member 5 projecting out of the back plate 1, and rotated by a brake wire 8 for rotation of the cam member 5.

The cam portion 5a of member 5 is cut out on both its sides facing the shoe web free ends 2a, 2a' to form a pair of surfaces 5e and 5e', and is thus of smaller diameter. These surfaces 5e, 5e' are provided with cam collar grooves 9, 9' which are symmetrical about a bore 10 through which an actuating member passes, and are perpendicular to the surfaces 5e, 5e'. The cam collars 9, 9' have their bottoms tapering from the rear end 5a of member 5 and overlapping partially with each other at the front end of member 5 through the bore 10.

An actuating member 11 is mounted on the cam member 5 by inserting a right-hand thread 11b formed on one end of its shaft 11a into the bore 10 having a female thread 10a. The head 11c of member 11 takes abutment onto a pair of cam collars 12, 12' fitted into the cam collar grooves 9, 9' through a washer 13. An adjusting mechanism B comprises an adjusting gear 14, and is inserted into the cam member 5 from the opposite end thereof. The actuating member 11 is rotated with the adjusting gear 14 in one piece by fitting the flat end of the shaft 14a of gear 14 into a slot 11d in the actuating member 11.

The cam collars 12, 12 are formed of plates of a right-angled triangle, and have their inclined surfaces 12a, 12a' to be in contact with the tapering bottoms of grooves 9, 9. The vertical surface 12b, 12b' of collars 12, 12' take abutment onto the shoe web free ends 2b, 2b'. Thus, the collars are rotated with the cam member 5 in one piece, and moved toward the cam shaft by threaded insertion of the actuating member 11, whereby they are extended out of the opposite surfaces 5e, 5e' of the cam portion 5b to expand the brake shoes 2, 2'.

The back plate 1 is provided on its outside with a partition wall 15 which covers the mounting portion of the brake arm 7. The cam shaft 5f of member 5 extends from the wall 15 through a seal member 16. A dust cover 15 has its one end fitted into an axle boss 19 through a seal member 18 and its other end clamped onto the wall 15 by means of two screws 20. A cover mechanism C is arranged over the wall 15 to protect the adjusting mechanism B.

An adjusting lever 21 has an opening 21a of larger diameter in its one end and an opening 21b of smaller diameter in its other end, and includes a resilient pawl 21c. The lever 21 is fixed in place by inserting its larger opening 21a over the cam shaft 5f in such a manner that the cam member 5 can be rotated, and by clamping its other end between the wall 15 and the dust cover 17, while inserting a screw 20 into its smaller opening 21b. The point of pawl 21c mates with the teeth of gear 14, so that when the brake arm is actuated in the direction indicated by a in FIG. 11, the rotation of gear 14 is limited to the adjusting direction. Assembling of the adjusting gear 21 is thus easy as compared with the prior art adjusting lever arrangement in which the lever is fixed to the dust cover or the back plate by means of two screws. In addition, the location of pawl 21c is convenient, and an error in mating is within the tolerance of the adjusting lever. Therefore, it is possible to avoid a combined error of 12e dust cover and the adjusting lever as is often the case with the prior art. Variations in the loads applied on the adjusting gear 14 by the resilient pawl 21c are reduced, so that the gear 14 is set in stable state. Accordingly, there is no fear that, during braking, the resilient pawl 21c may go over the tooth of 14c of gear 14 and mate with the next tooth 14c, resulting in rotation of gear 14 and over-adjustment.

Since variations in the loads applied on the adjusting gear 14 by the resilience pawl 21c of lever 21 are also limited or reduced, i.e., since too large or small a load is not impressed on the adjusting gear 14, it is possible to avoid such inconveniences that the rotation of gear 14 is not transmitted as a result of the elastic deformation of the resilient portion 22c of a feed pawl means 22; the rotation of gear 14 is not restricted as a result of the elastic deformation of the resilient pawl 21c of lever 21 thus leading to improper adjustment; etc. This assures that constantly stable braking is achieved with no loss of the brake-gap.

The feed pawl means 22 has an opening 22a in its center, which is provided at its peripheral edge with three pieces at equal intervals, said pieces being bent in the direction opposite to the fitting direction, and urged against the cam shaft. The feed pawl means 22 is fitted over the cam shaft 5f by urging its pieces against three axial flat sections 5g formed around the shaft 5f at equal intervals, said sections being chamfered off. Three resilient pawls 22c, provided at equal intervals, extend from the outer edge of the feed pawl means 22, the upper ends of said pawls being bent horizontally. These resilient pawl 22c mate with the teeth 14c of the gear 14. The feed pawl means 22 rotates integrally with the cam member 5 in response to the pivotal movement of the brake arm 7. Upon the brake linings 2c, 2c' reaching the critical abrasion value, the feed pawl means 22 mates with the next tooth 14c of gear 14. When the brake arm 7 is restored to its inital position, the feed pawl means 22 rotates the adjusting gear 14 by one tooth, so that the resilient pawl 21c of lever 21 mates with the next tooth 14c of gear 14 for completion of adjustment.

While three resilient pawls 22c are formed on the feed pawl means 22 at equal intervals in this embodiment, a suitable number of resilient pawls may be used. It is noted that the more the number of said pawls 22c, the smoother and the surer the operation of the feed pawl will be.

After the adjusting lever 21 has been inserted over the cam shaft 5f, the feed pawl means 22 is forcedly inserted over the cam shaft 5f, while its pieces 22b are located at the engaging portions 5g. The feed pawl means 22 is then inserted smoothly along the engaging portions 5g, and reach given positions at which its pieces 22b are urged against the engaging portions 5g. Thus, the feed pawl means 22 is fixed in place with no rattling, and rotated integrally in response to the rotation of the cam member 5 with no loss in the rotation of the feed pawl means 22.

During adjustment, the feed pawl means 22 is attached to the cam shaft 5f with no play. Accordingly, the feed pawl means 22 is surely rotated in proper response to the rotation of the cam member 5, so that it works well with no loss in adjustment. Thus, a brake-gap is always kept at a given value for stable braking.

Figure 18:
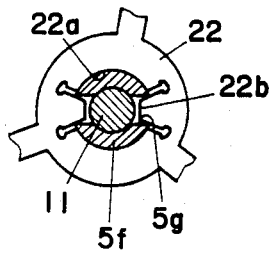

FIG. 18 shows another embodiment of the engagement of the cam shaft 5f with the feed pawl means 22. In accordance with this embodiment, the cam shaft 5f is provided with slots 5g extending axially from the rear end thereof, with which the piece 22b of pawl means 22 are engaged. The pieces 22b are then fitted into the slots 5g without interfering with the actuating member 11, and permit resilient forces to be applied on the entry corners of slots 5g with no play. Therefore, the rotation of means 22 is positively stopped.

Operation of this embodiment is as follows

Figure 6:
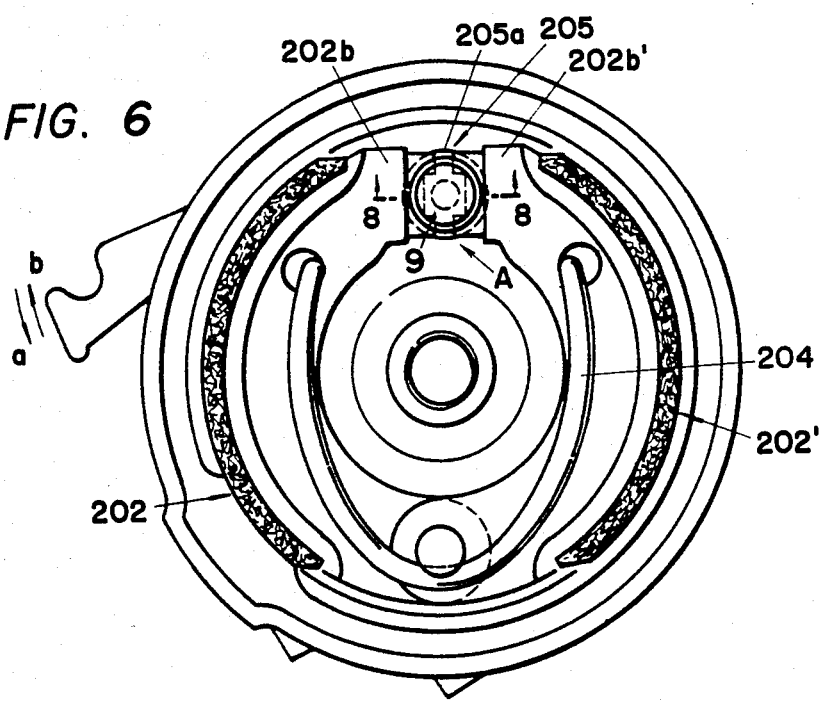
Figure 7:
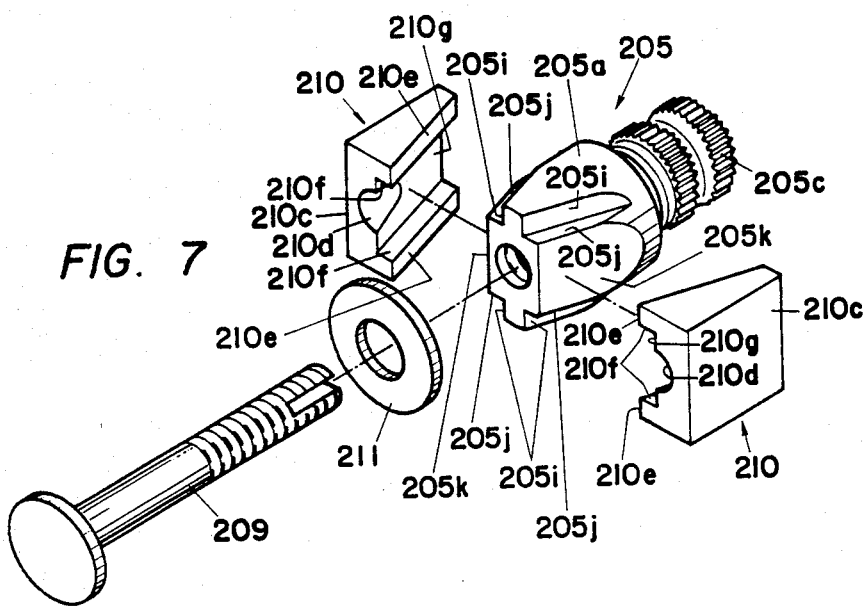
Figure 8:
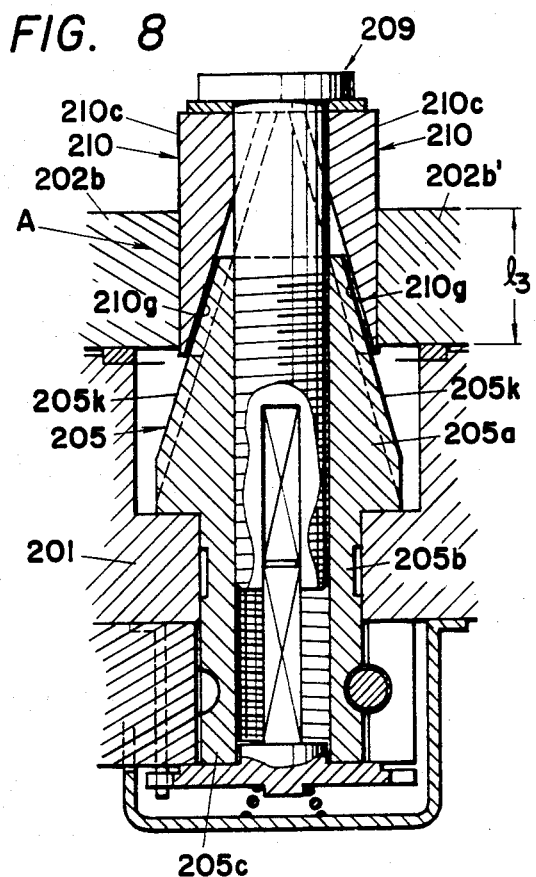
Figure 9:
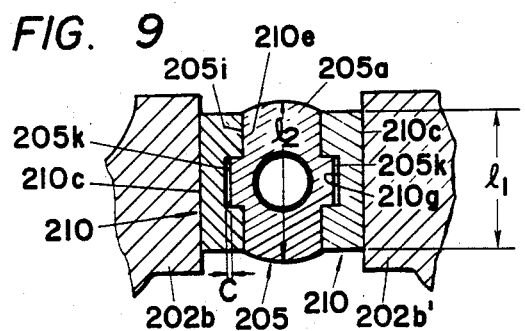

As shown in FIG. 6, assembling of the brake shoes 2, 2 is achieved by allowing the shoe web free ends 2b, 2b' to abut upon the surfaces 5e, 5e' of the cam member 5 and the vertical surfaces 12b, 12b' of the cam collars 12, 12'. In this inital state of assembling, the cam collars 12, 12' are slightly fitted into the cam roller grooves 9, 9', and overlap partially with each other, so that the width of the cam is reduced, and the cam is positioned in the vicinity of the shoe web free ends 2b, 2b.

Figure 10:
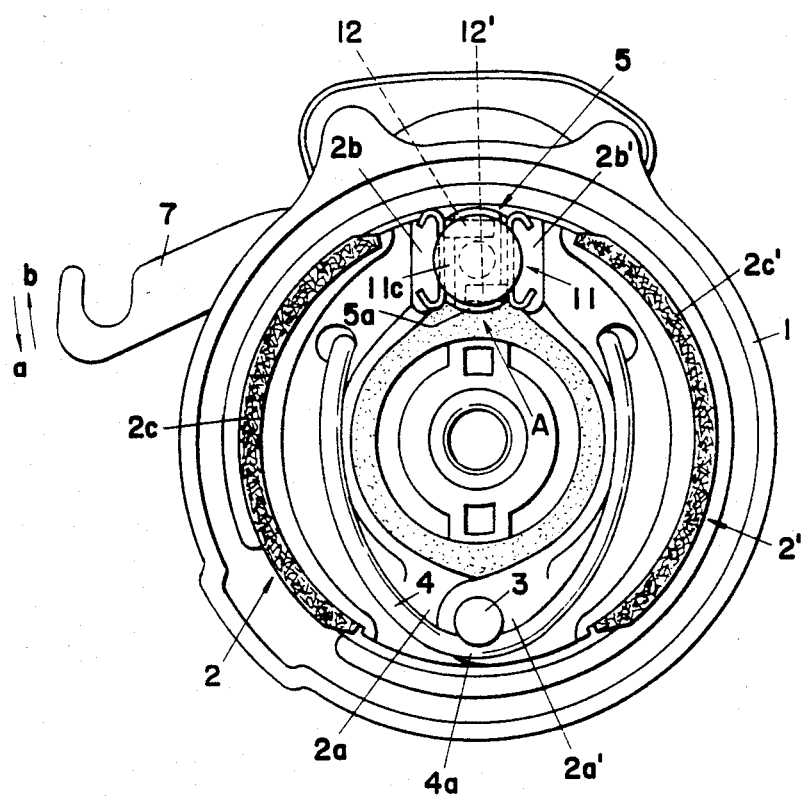
FIGS. 10 to 30 inclusive show another embodiment of the automatic brake-gap adjuster system according to the present invention.
Figure 11:
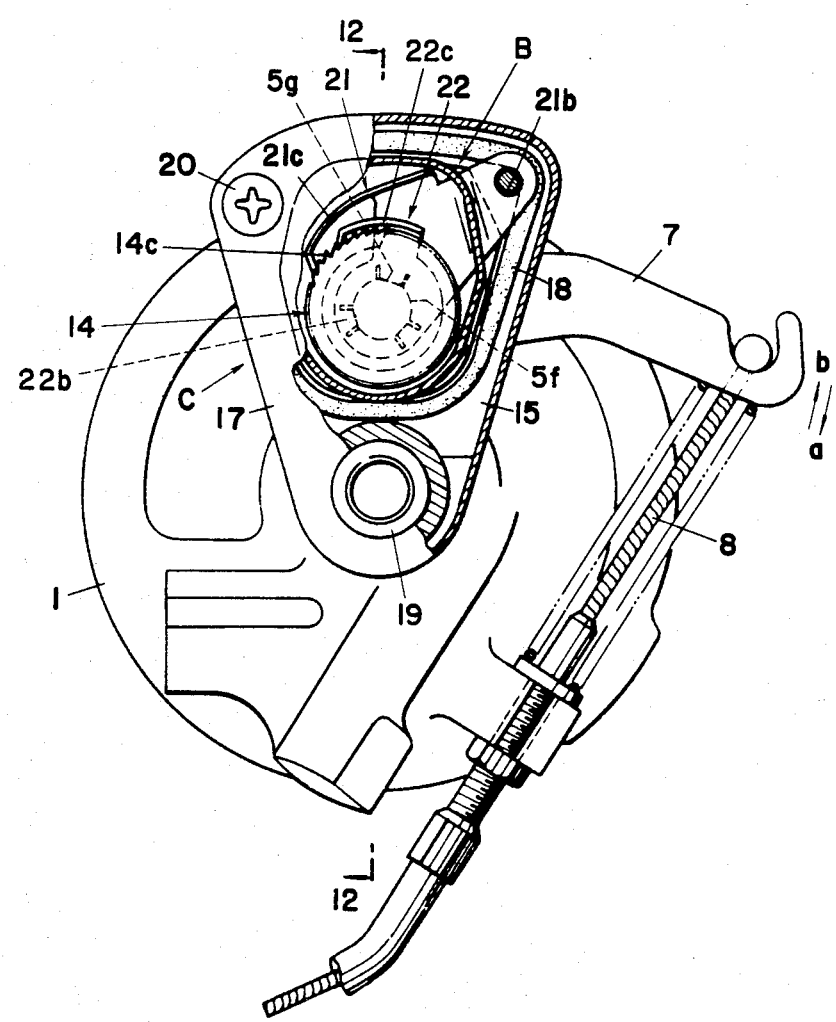
Figure 12:
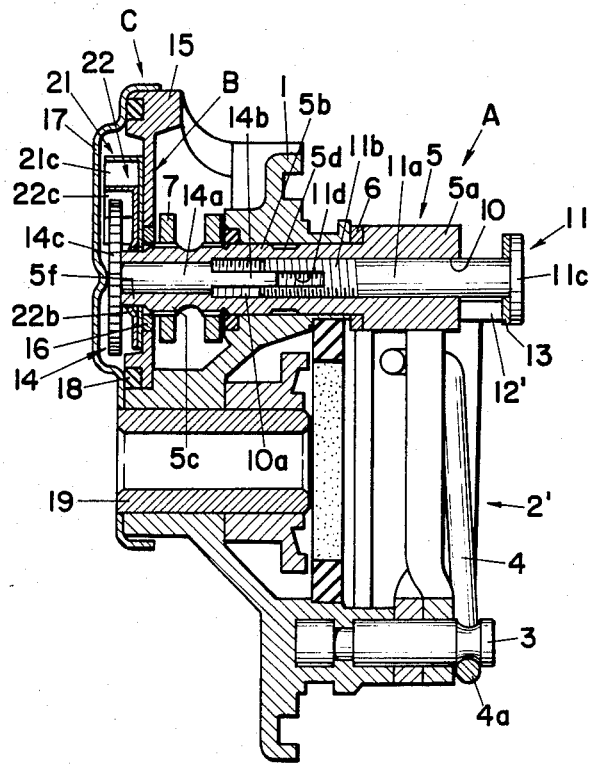
Figure 13:
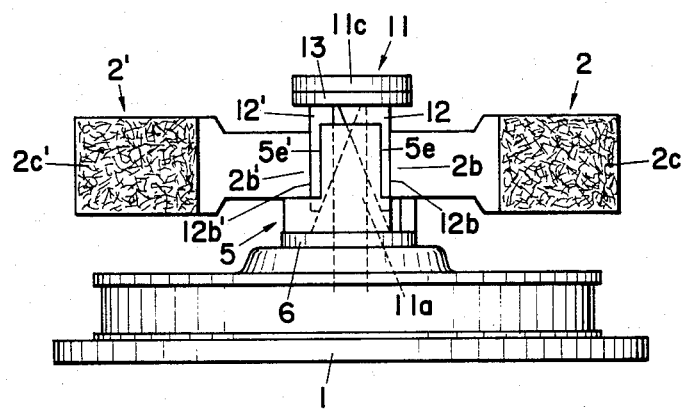
Figure 14:
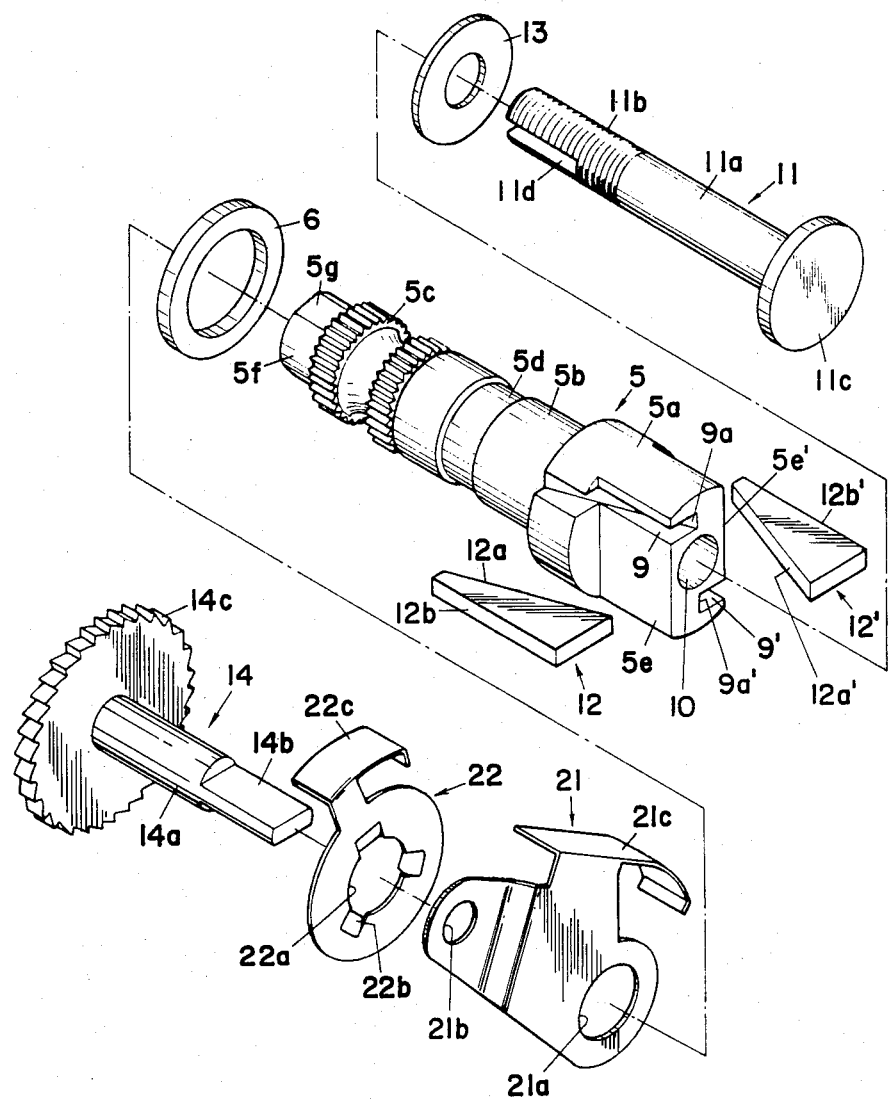
Figure 15:
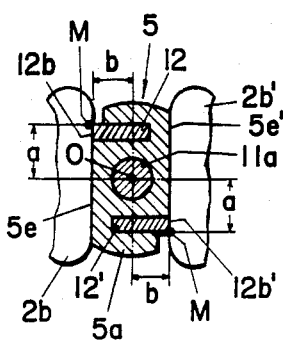

Upon putting on the brake by operation of a brake lever or pedal, the brake arm 7 is rotated through a brake wire 8 in the direction indicated by an arrrow a in FIG. 11 and, with rotation of this arm, the cam member 5 is rotated in the counterclockwise direction in FIGS. 10 and 15, thereby to force open the shoe web free ends 2b, 2b'. The brake shoes 2, 2' are thus moved apart against the action of the shoe return spring 4 so that the brake linings 2c, 2c' abut tightly upon the inner periphery of a brake drum (not shown).

The cam member 5, the cam collars 12, 12', the adjusting gear 14 and the actuating member 11 are then rotated in one piece with rotation of the brake arm 7. However, the angle of rotation of the brake arm is restrained to a range over which the resilient portions 22c of pawl means 22 and the resilient pawl 21c of lever 21 slide on the incline of the same tooth 14c of the adjusting gear 14.

Upon release of braking, the brake shoes 2, 2' are restored to their initial positions by the action of the shoe return spring 4 and, correspondingly, the cam member 5, the cam collars 12, 12', the adjusting gear 14 and the feed pawl means 22 are rotated clockwise in one piece into their original positions. In this case, the cam width of the cam portion 5a is small, and the distance between the cam's axial point O and the points M at which the cam collars 12, 12' abut upon the shoe webs 2b, 2b' is short, as expressed in terms of b/a. This is best shown in FIG. 15. Accordingly, the cam member 5 can easily return to its initial position under the action of the shoe return spring 4 without any inconveniences.

If the brake linings 2c, 2c wear away due to braking to such an extent that there is a braking-gap exceeding a preset value between the inner periphery of the brake drum and the surfaces of the linings 2c, 2c', then there is an increase in the amount of rotation of the cam member 5, the cam collars 12, 12', the actuating member 11 and the adjusting gear 14 which rotate in one piece during braking. However, the rotation of gear 14 is limited by the resilient pawl 21c of the adjusting lever 21, while both the cam member 5 and the cam collars 12, 12' turn in proportion to said increase in the braking-gap. As a result, the adjusting gear 14 and the actuating member 11 are rotated in one piece, so that the resilient pawls 22c of pawl means 22 go over one tooth of the adjusting gear 14 and mate with the next tooth 14c. In the meantime, the actuating member 11 is threadly inserted into the cam member 5, and moved in the left-hand direction in the drawing, so that the cam collars 12, 12' are moved toward the back plate 1 by the head 11c of the actuating member 11, whereby the cam collars 12, 12' are axially slid in the cam collars 12, 12'. As a consequence, the cam collars 12, 12' are extended out of the surfaces 5e, 5e' of the cam portion 5a to move apart the brake shoes, whereby the shoe web free ends 2b, 2b' are forced open for adjustment of the brake-gap.

Figure 16:
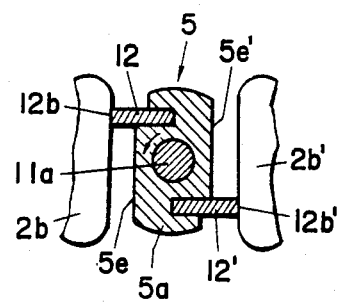

Release of braking then causes integral rotation of the brake arm, the cam member 5, the cam collars 12, 12', the adjusting gear 14 and the actuating member 11 in the direction indicated by b in FIG. 10 or 11. In this case, the adjusting gear 14 is surely rotated with the cam member 5 in one piece by the feed pawl means 22, so that the resilient pawls portions of lever 21 go over the one tooth of the adjusting gear 14 and mate with the next tooth 14c for completion of adjustment, and then returns to the original position. Accordingly, the linings 20c. 2c' wear off, the resilient pawl portions 21c of lever 21 mate in sequence with the teeth 14c of gear 14, and the cam collars 12, 12' are extended to expand the brake shoes as shown in FIG. 16, whereby the brake-gap is always kept constant in an automatic manner.

Adjustment is achieved in a state where the shoe web free ends 2b, 2b' of shoes 2, 2' are expanded by the cam collars 12, 12' formed on the cam member 5a, and spaced away from the surfaces 5e, 5e' of the cam portion 5a, whereby the brake shoes 2, 2' are expanded around the anchor pin 4 with progress of abrasion of the linings 2c, 2c'. Even when the outer sides of the shoe web free ends 2b, 2b' are spaced away from the surfaces 5e, 5e' of the cam portion 5a, the cam collar 12 abuts upon the outer side of the shoe web free end 2b on the leading side, while the cam collar 12' abuts upon the inner side of the shoe web free end 2b' on the trailing side, so that, during braking, the rotational force of the cam member 5 is properly transmitted from the cam collars 12, 1 2' to the brake shoes 2, 28 on the leading and trailing sides. Thus, there is no loss in the expansion of the brake shoes 2, 2'.

Figure 17:
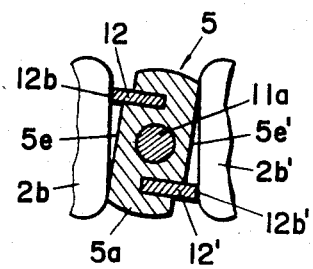

Even when extension of the brake wire 8 takes place due to repeated braking, the cam portion 5a remains reversed in the clockwise direction in proportion to the amount of said extension of the wire 8, since the cam portion 5a of the cam member 5 is loaded on both its sides with forces as a result that, as shown in FIG. 17, the brake shoes 2, 2' are always biased toward each other under the action of the shoe return spring 4. Although this leads to widening of the brake-gap between the linings 2c, 2c' and the inner periphery of the drum brake, the brake-gap can be kept constant, since there is an increase in the amount of rotation of the cam member 5 in response to the rotation of the brake arm 7 during braking, which results in an increase in the relative amount of rotation of the adjusting gear 14. Accordingly, the adjusting lever 21 goes over one tooth of the adjusting gear 14 and mates with the next one, while containing an extension of the brake wire 8.

The foregoing embodiment of the present invention is best suited for use with the mechanical drum brake of small size, since the width of the cam portion is reduced as much as possible by causing the cam collars to overlap partially with each other at the initial state of assembling. Satisfactory returning of the brake shoes is also attained during release of braking with no fear that the cam portion may be caught, so that the brake can always be put on smoothly and surely. In addition, the rotational force of the cam member is transmitted from the cam collars to the shoe web free ends with no loss, and the brake shoes are expanded immediately in response to the pivotal movement of the brake arm, since the cam collars always abut upon the free ends. Moreover, even when the brake wire for actuating the brake arm is extended due to repeated braking, such an extension can be adjusted so as to keep always the brake-gap constant, since it is possible to increase the amount of rotation of the cam member in such a manner that the amount of extension of the brake wire is contained therein.

Figure 19:
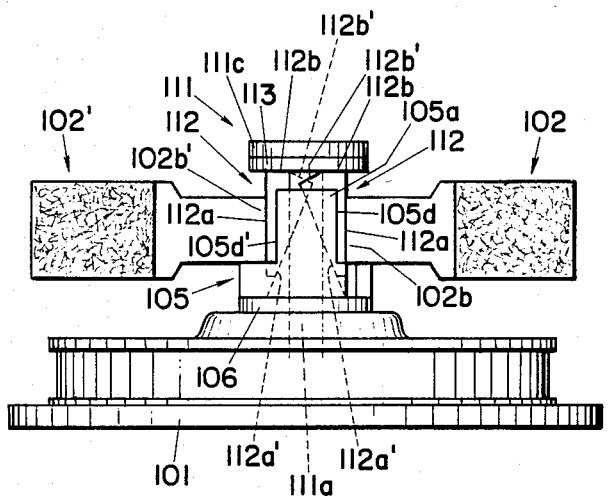
Figure 20:
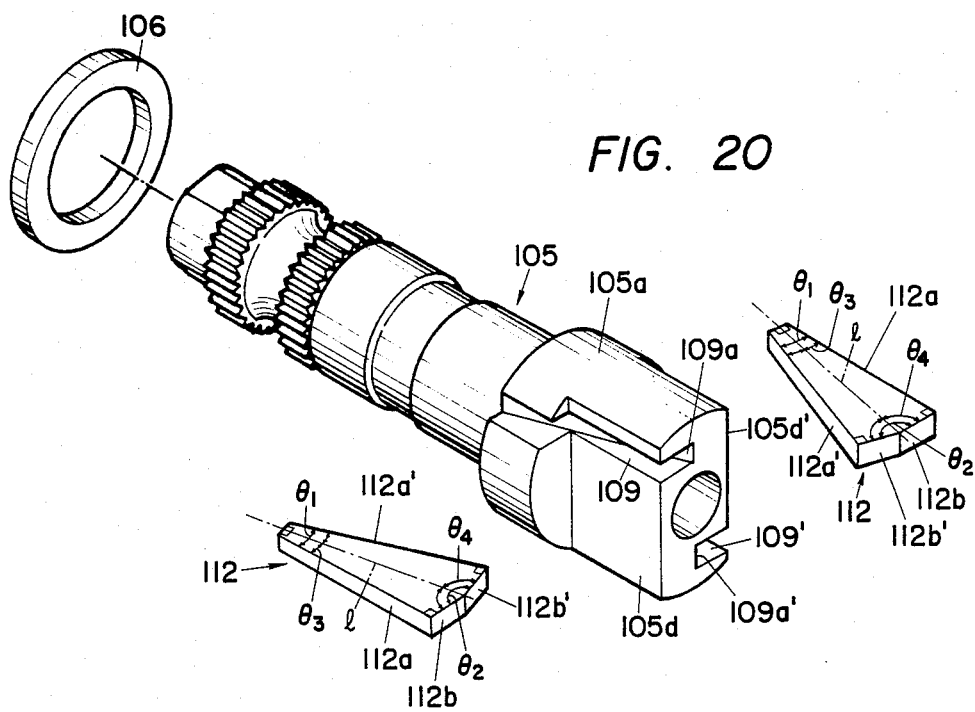
Figure 21:
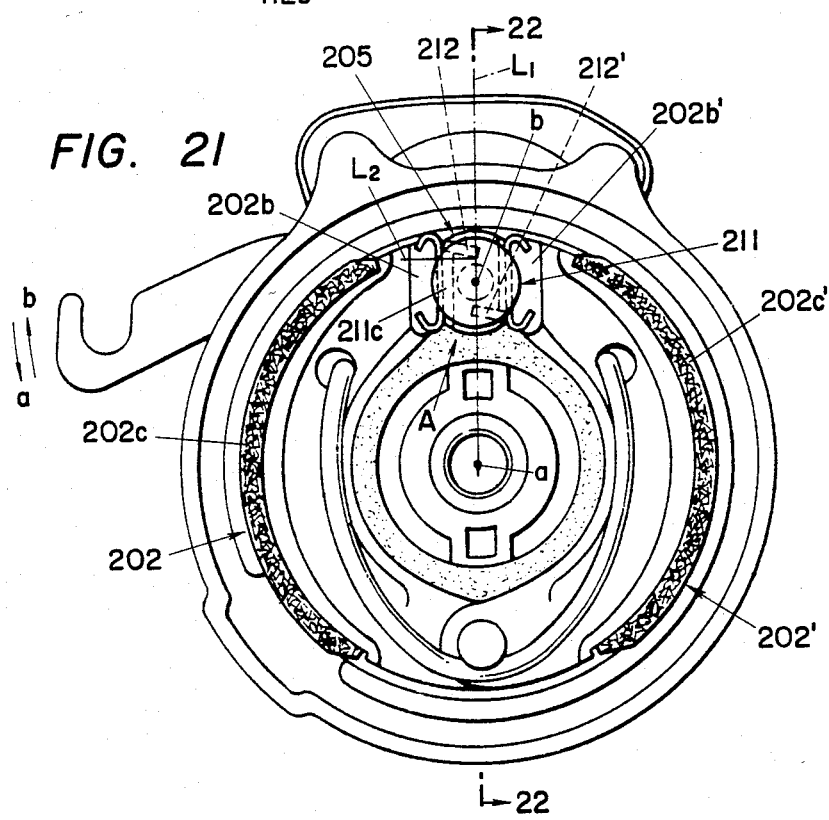
Figure 22:
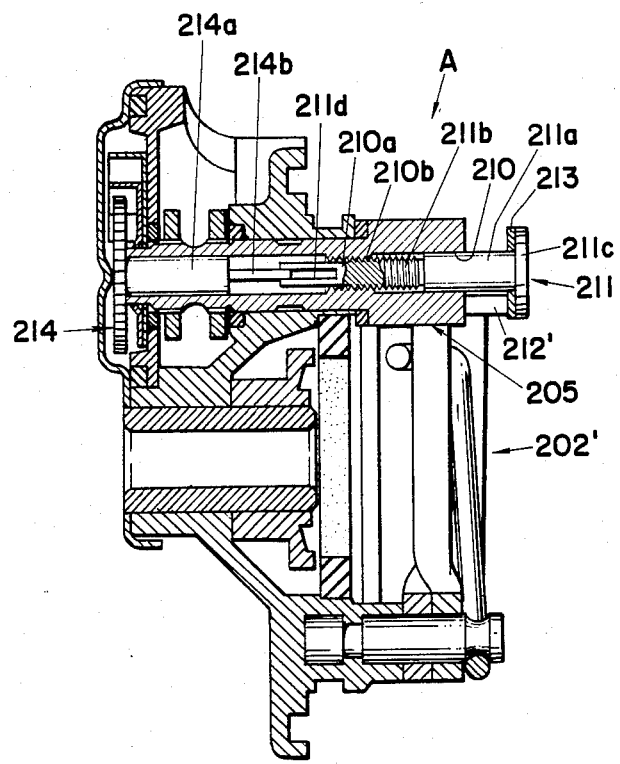
Figure 23:
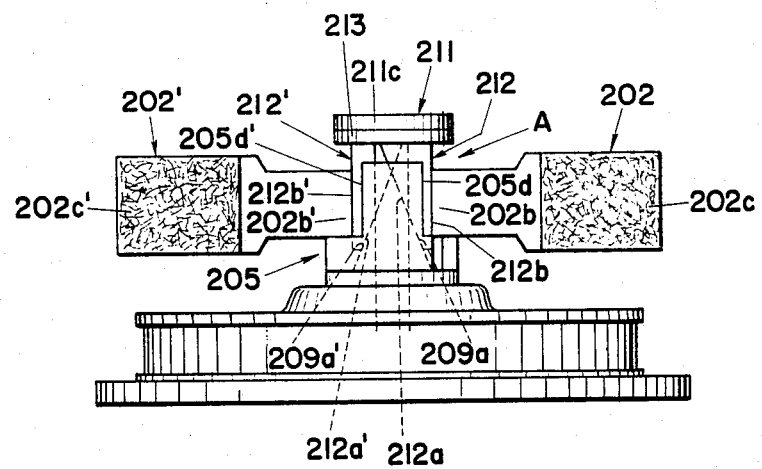

Referring to FIGS. 19 and 20, there is shown an embodiment of the mechanism A for expansion of the brake shoes.

In this embodiment, a pair of cam collars 112 are in the plate form. Each cam collar 112 has first surfaces 112a, 112a' upon which the shoe web abuts and second surfaces 112b, 112b' upon which the actuating member abuts, said first and second surfaces being symmetrical about a center line l. An angle $\theta_1$ at which the first surfaces 112a, 112a', intersect is acute, while an angle $\theta_2$ at which the second surfaces 112b, 112b' intersect is obtuse. In other words, an angle $\theta_3$ which the center line 1 makes with the first surfaces 112a or 112a' is smaller than an angle $\theta_4$ which the center line 1 makes the second surface 112b or 112b'. The ends of the first surfaces 112a, 112a' of acute angles are cut at right angles with the center line 1 to obtain a plate of a symmetrical pentagon. A pair of the thus obtained cam collars 112, 112' are fitted into cam collar grooves 109, 109' with their first surfaces 112a, 112a' abutting upon the shoe web free ends 102b, 102', while their second surfaces 112b',112b' abutting upon the tapering bottoms 109a, 109a' of the grooves 109, 109'. The second surfaces 112b, 112b which intersect at right angles with the first surfaces 112a, 112a abutting upon the the shoe web free ends 102a, 102b' are caused to abut upon the head 111c of the actuating member 111 through a washer 113, while the second surfaces 112b', 112b' which intersect at right angles with the first surfaces 112a', 112a' abutting upon the tapering bottoms 109a, 109a' of grooves 109, 109' are not caused to abut upon the head 111c of the actuating member 111.

These cam collars 112, 112 are rotated with the cam member 105 in one piece, and moved toward the cam shaft by the head 111c of the actuating member 111 inserted threadedly therein, thus extending out of the opposite surfaces 105d, 105d' to expand the brake shoes 102, 102'.

Said pair of cam collars 112, 112 may be caused to abut upon the tapering bottoms 109a, 109a' of grooves 109, 109' at either one of their first surfaces 112a, 112a', since they are formed into the same shape that is symmetrical about the center line. The cam collars are also not limited with respect to the leading and trailing sides.

While this embodiment uses the cam collars 112 in the pentagonal form, it is understood that use may be made of any polygonal plate having the first and second surfaces 112a, 112a' which intersect at right angles with each other in a symmetrical position about the center line, in which an angle $\theta_1$ at which the first surfaces 112a, 112a' intersect is acute, while an angle $\theta_2$ at which the second surfaces 112b, 112b' intersect is obtuse.

With the foregoing arrangement, the cam collars can be fitted into the cam collar grooves with enhanced efficiency, but with no fear that it may be placed in an improper position, since either of the first surfaces can be engaged with the shoe web free ends or the tapering bottoms of the cam collar grooves, and the cam collars themselves are not limited with respect to the leading and trailing sides.

FIGS. 21 to 26 inclusive show another embodiment of the mechanism A for expansion of brake shoes.

According to this embodiment, cam collar grooves 209, 209' are formed on a cam member 205, but they are inclined by an angle $\theta$ in a direction counter to the operating direction of the cam member 205, said angle being defined with respect to a line $L_2$ extending perpendicularly to a line $L_1$ drawn by connecting the center a of a brake drum with the center b of the cam shaft. This is an angle at which the cam collar grooves 209, 209' are in coincidence with line $L_2$ in a state where the cam member 205 is rotated in its operating direction to expand brake shoes 202, 202', which then engage with a drum brake.

Accordingly, there is no local load applied on the cam collars grooves 209, 209', since this embodiment is designed in such a manner that, during braking, the cam collars 202, 202' receive braking torques by causing the brake shoes 202, 202' to engage with the brake drum in the direction normal to line $L_1$ drawn by connecting the center a of the brake drum with the center b of the cam shaft.

Figure 24:
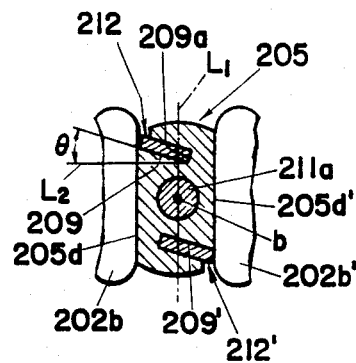
Figure 25:
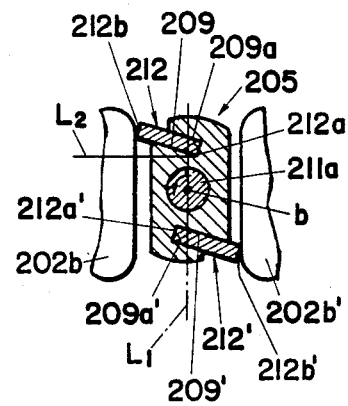
Figure 26:
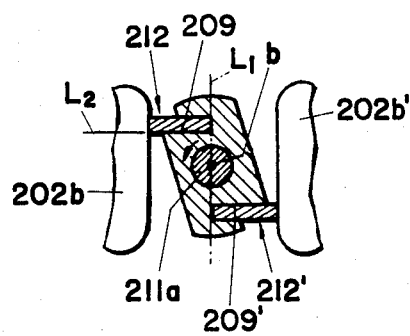

A bore 210 through which the actuating member passes is provided substantially at its center with a prtion 210a of smaller diameter. This portion 210a is formed with a female thread, and has its one end serving as a stopper step 210b. On the other hand, an actuating member 211 includes a straight shaft 211a from which a shaft portion 211b of smaller diameter extends, having a male thread. The actuating member 211 is fixed in place by inserting slidingly its straight shaft 211a into bore 210 and putting the male thread of the shaft 211b of smaller diameter in engagement with the female thread of the portion 210a of smaller diameter. The head 211c of member 211 then abuts upon a pair of cam collars 212, 212' fitted into the cam collar grooves 209, 209' via a washer 213. The flat portion 214b of shaft portion 214a of an adjusting gear 214 inserting through the cam member 205 from the opposite side is fitted into a slot 211d in the actuating member 211. Accordingly, rotation of the adjusting gear 214 causes rotation of the actuating member 211. Upon the brake linings 202c, 202c' reaching the critical abrasion value, the end of the straight shaft 211a of member 211 is engaged with the stopper step 210b, so that threaded insertion of the actuation member 211 is restricted. At the initial position after adjustment, as shown in FIG. 24, the cam member 205 is placed in such a manner that its opposite surfaces 205d,205d' are in parallel with the brake shoe free ends 202b, 202b' of shoes 202, 202'. However, the cam collars 212, 212' are extended in the expanding direction of shoes 202, 202', and inclined by the same angle as an angle $\theta$ in FIG. 23 in a direction counter to their operating direction with respect to line $L_2$ extending at a right angle with line $L_1$ drawn by connecting the center a of the brake drum with the center b of the cam shaft, so that the shoe web free ends 202b, 202b' are moved apart for keeping the brake-gap constant. When the cam member 205 is rotated from this state in its operating direction, the cam collars 212, 212' give braking forces on the shoe web free ends 202b, 202b' from the direction in coincidence with line $L_2$ extending at a right angle with line $L_1$ drawn by connecting the cneter a of the brake drum with the center b of the cam shaft. The cam collars 212, 212' then receive braking torques in a state where they are at right angles with the shoe web free ends 202b, 202b'. Hence, a chance of shifting of the points at which the shoe web receives forces is reduced, thus assuring reliable braking operation. Further, the cam collar grooves 209, 209' can surely receive braking torques from the vertical direction through the cam collars 212, 212', since any local load is not applied thereon. This helps reduce a chance of damaging the sliding surface of collars 212, 212' and grooves 209, 209'. Accordingly, even if the cam collars 212, 212' are applied for longer periods of time, they are operated smoothly by the actuating member 211, thus assuring proper adjustment.

According to this embodiment, reliable engagement of the the brake shoes with the brake drum is achieved by the cam collars for surer braking, since the cam collar grooves into which the cam collars are fitted are formed in the cam portion of the cam member in such a manner that, during braking, they are inclined in the direction counter to the operating direction of the cam member so as to permit them to be at a right angle with a line drawn by connecting the point of the brake drum with the center of the cam shaft. Since braking torques are hardly converted to local loads which may otherwise be applied upon the cam collars grooves through the cam collars, there is no or little chance of damaging the sliding surface of the cam collars and grooves. Therefore, the cam collars work smoothly for proper adjustment.

Figure 27:
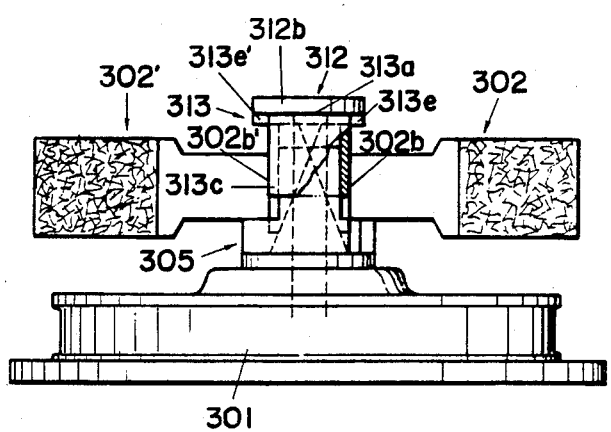
Figure 28:
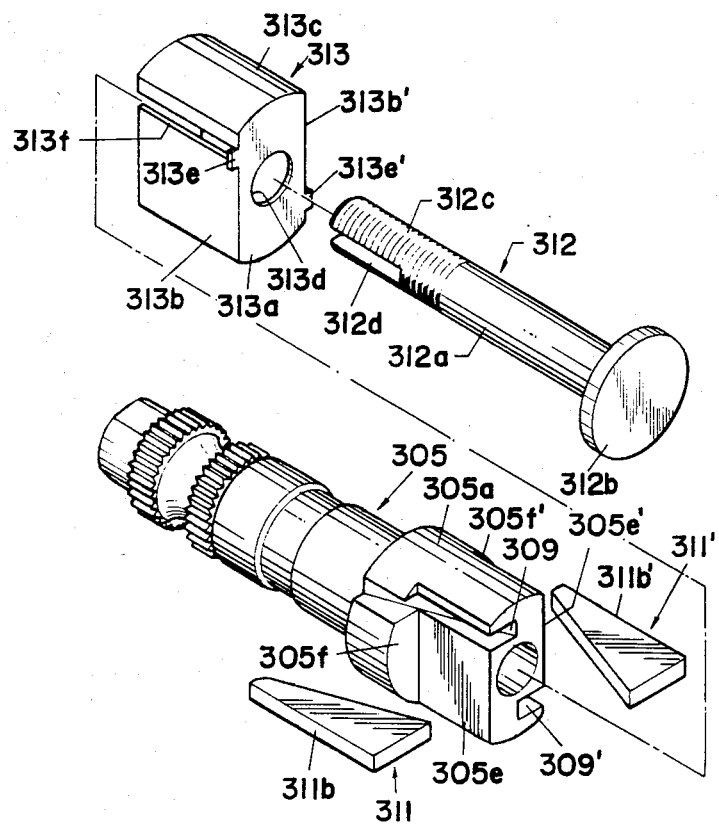
Figure 29:
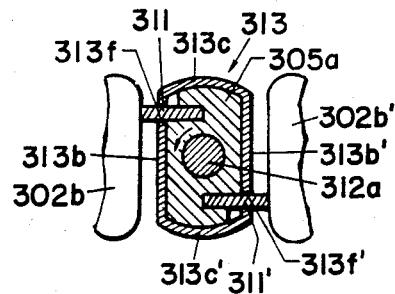

A further embodiment of the mechanism A for expansion of brake shoes is shown in FIGS. 27 to 29.

A cam cover 313 for protecting a cam member 305 includes a ceiling 313a for covering the front end of a cam portion 305a and the front ends of cam collars 311, 311' as well as flat skirts 313b, 313b' for covering the opposite surfaces 305e, 305e' of portion 305a and curved skirts 313c, 313c' for covering the upper and lower curved surfaces of portions 305a. The ceiling 313a has in its central portion a bore 313d through which the shaft portion 312a of an actuating member 312 passes, and includes projecting pieces 313e, 313e' for covering the front ends of cam collars 311, 311' extending out of the opposite surfaces 305e, 305e' of portion 305a. The flat skirts 313b, 313b' are formed therein with axial notches 313f, 313f' which allow movement of cam collars 311, 311' in the expanding direction of shoes. Both the flat and curved skirts 313b, 313b' and 313c, 313c' have a length within the stroke of adjusting, i.e., a length that does not permit the ends of skirts 313b, 313b' to abut upon steps 305f, 305f' of the cam portion 305a until adjustment is effected.

The cam cover 313 is assembled in such a manner that the skirts 313b, 313b', 313c, 313c' are fitted in the cam portion 305a, the ceiling 313a is engaged with the front ends of cam collars 311, 311' and covers the front end of portion 305a through a space, and the shaft portion 312b of member 312 is inserted into the opening 313d to engage the head 312b of member 312 with the ceiling 313a, so that the ceiling 313a is positioned between the front end of portion 305a and the head 312b of member 312. In the thus assembled arrangement, the cam cover 313 allows the cam portion 305a to be slid toward the cam shaft in association with threaded insertion of the actuating member 312.

In this embodiment, the ceiling 313a of cover 313 serves as a washer, and rotation and threaded insertion of the actuating member 312 are not affected by encroachment of collars 311, 311'. It is understood that a separate washer may be interposed between the ceiling 313a and the head 312b of the actuating member 312, and that the ceiling 313a may not be formed with the pieces 313e, 313e' for covering the projecting front ends of collars 311, 311'.

The brake shoes 302, 302' are assembled in such a manner that the cam cover 313 is fitted into the cam portion 305a, and the shoe web free ends 302b, 302b' are engaged with the opposite surfaces 305e, 305e' of portion 305a through the skirts 313b, 313b' and with the vertical surfaces 311b, 311b' of collars 311, 311'. At such initial state of assembling, the cam collars 311, 311' are slightly fitted in to the cam collar grooves 309, 309', and overlap with each other, so that the cam width is small, and the shoe web free ends 302b, 302b' are close to each other.

The actuating member 312 is threadedly forced down into the cam member 305 in FIG. 27, and the cam collars 311, 311' are moved toward the back plate 301 by the head 312b of member 312 through the ceiling 313a, whereby the cam collars 311, 311' are axially slid in the grooves 309, 309' and extended out of the cut-outs 313f, 313f' in the cover 313 to expand the brake shoes. Thus the shoe web free ends 302b, 302b' are forced open for adjustment of the brake-gap.

According to this embodiment, no entrance of sand, powders resulting from wearing, etc. into the grooves takes place, since the cam cover is slidably fitted into the cam member to cover the cam member and the cam collars fitted slidably into the grooves. Thus, sliding movement of the cam collars in their adjusting direction can be effected smoothly, and the amount of adjustment effected by rotation and threaded insertion of the actuating member can be kept constant. Brake-gap adjustment of this embodiment is satisfactory over extended periods of time.

Even though the cam collars encroach upon the ceiling, it has no adverse influence upon the rotation and threaded insertion of the actuating member, since the ceiling also serves as a washer.

Figure 30:
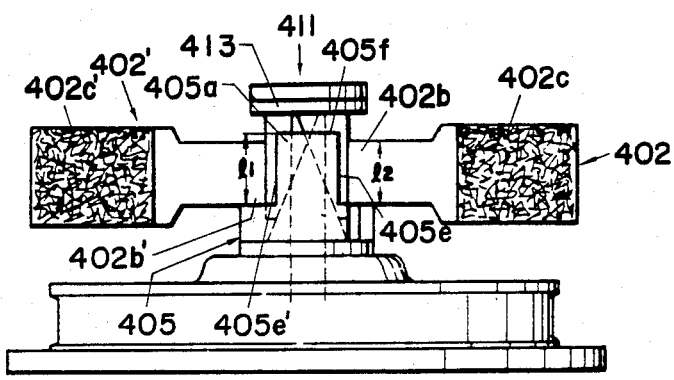
Figure 31:
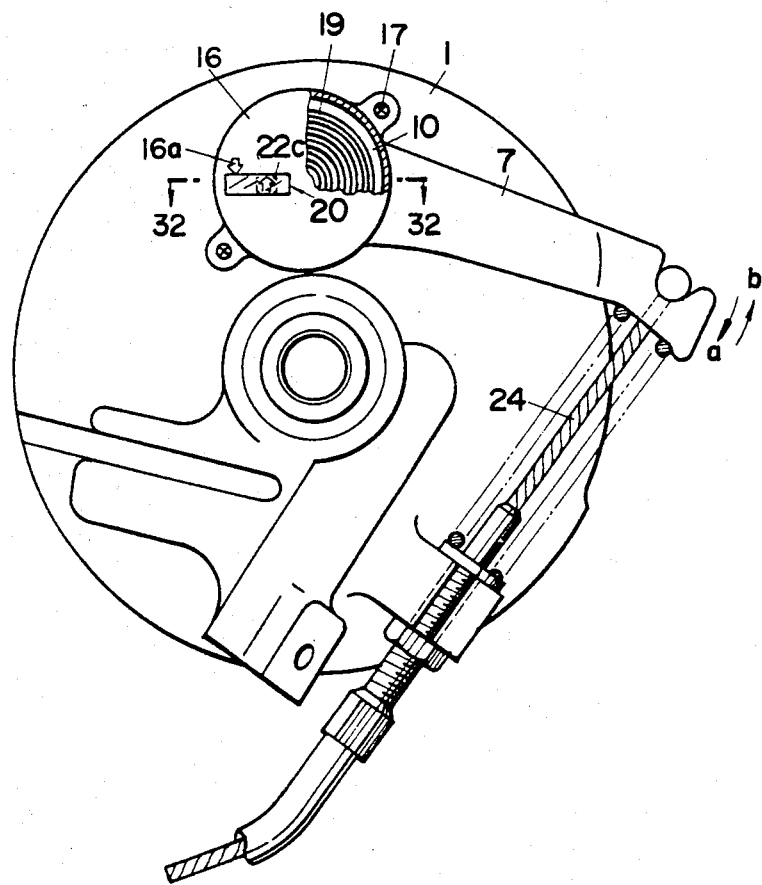
FIGS. 31 to 36 inclusive show a further embodiment of the automatic brake-gap adjuster system according to the present invention.
Figure 32:
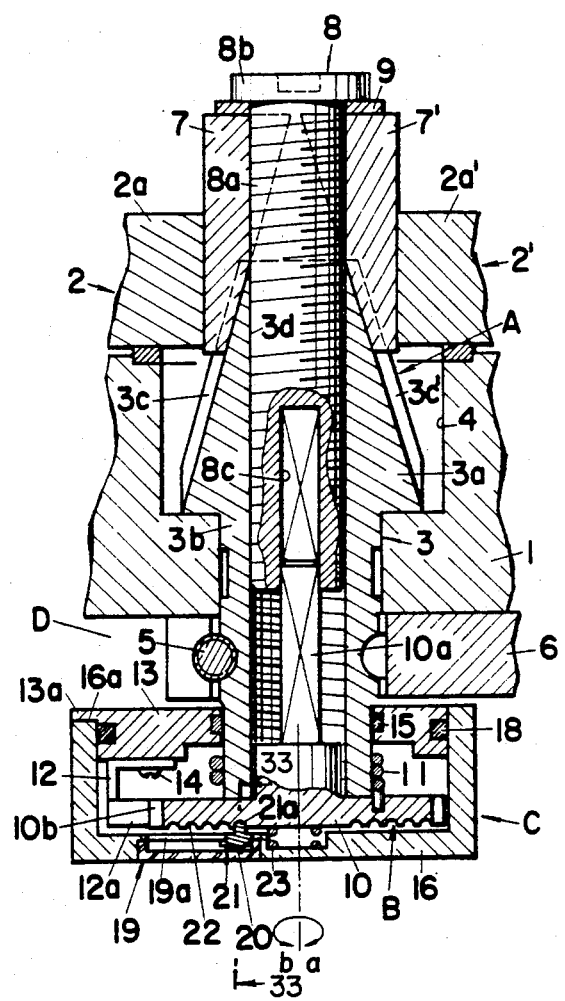
Figure 33:
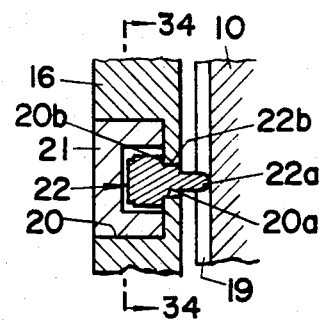
Figure 34:
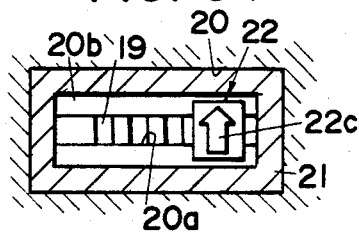

A still further embodiment of the mechanism A for expansion of brake shoes is illustrated in FIG. 30.

The cam portion 405a of a cam member 405 is cut out on the side facing the shoe web free ends 402b, 402b' to form a pair of opposite surfaces 405e, 405e'. The length $l_1$ of surfaces 405e, 405e' is greater than the thickness $l_2$ of ends 405b, 405b'.

Upon the linings 402c, 402c' reaching the critical abrasion value, the head 411c of the actuating member 411 is engaged with the front end face 405f of the cam portion 405a through a washer 413 to limit the threaded insertion of the actuating member 411, whereby engagement of the shoe web free ends 402b, 402b' with the member 411 is avoided. This assures free movement of the shoe web free ends 402b, 402b', leading to smooth and sure braking due to satisfactory expansion of the brake shoes 402, 402'. By limiting the threaded insertion of the actuating member 411, any overadjustment is avoided. This results in an increase in the stroke of the brake lever or pedal, which is an indication for replacement of the brake shoes 402, 402'. In addition, limitations placed upon the threaded insertion of the actuating member 411 prevent the adjusting gear and the adjusting lever mating therewith from suffering damages or failures, since the adjusting gear for rotating the actuating member 411 is not pushed out by the actuating member 411.

A still further embodiment of the automatic brake-gap adjuster system for a mechanical drum brake according to the present invention will now be explained with reference to FIGS. 31 to 36 inclusive.

A back plate 1 is provided on its inside with a pair of brake shoes 2, 2, between which is disposed a mechanism A for expansion of brake shoes. On the outside of plate 1 and at a given position spaced away from plate 1, the mechanism A is provided at its end with an adjusting mechanism B for regulating a brake gap in response to the abrasion of brake linings. This mechanism B is closed by a covering mechanism C with an air passage D between the back plate 1 and the adjusting mechanism B.

The mechanism A includes a cam member 3 for expansion of shoe 2, 2, which has a cam portion 3a fitted into a recession 4 in the back plate 1 and can shaft 3b rotatably mounted on the back plate 1. The cam member 3 is rotated by operation of a brake arm 6 fixed to the cam shaft 3b extending out of the back plate 1 by means of a clamp bolt 5. The cam portion 3a of member 3 is formed with axially tapering guide grooves 3c, 3c' on both its sides facing the shoe web free ends 2a, 2a'. Into such grooves are fitted cam collars 7, 7' in such a manner that they are rotatable with the cam member 3 and slidable toward the cam shaft. An actuating member 8 includes a shaft portion having a right-hand male thread 8a engaged with a female thread 3d of member 3 in such a manner that it is movable toward the cam shaft. The head 8b of member 8 then abuts upon the front ends of a pair of cam collars 7, 7' fitted into the grooves 3c, 3c' through a washer 9.

The adjusting mechanism B is rotatably mounted on the cam shaft 3b of member 3 by fitting the shaft portion 10a of its adjusting gear 10 into a slot 8c formed in the rear end of member 8. A clutch spring 11 has its one end locked to the adjusting gear 10, and is wound around the cam shaft 3b in such a manner that it contracts when the cam member 3 is rotated into the original position. Upon the abrasion of the brake linings exceeding a given value, the clutch spring 11 causes the adjusting gear 10 to be rotated simultaneously with return rotation of the cam shaft 3b for reliable feeding of the adjusting gear 10 in engagement with a stopper 12. Rotation of the adjusting gear 10 causes threaded insertion of the actuating member 8 into the cam member 3, which permits the cam collars 7, 7 to be forcedly moved in a direction normal to the expansion of shoes 2,2. Thus, the brake shoes 2, 2' are moved apart for adjustment of a brake-gap.

The covering mechanism C includes a bottom plate 13 which is inserted over the cam shaft 3b and arranged unsymmetrically therearound. The bottom plate 13 is formed on its left-hand inside with the stopper 12 fixed in place by means of a screw 14, said stopper having its resilient Pawl 12a engaged with one tooth 10b of the adjusting gear 10. Between the bottom plate 13 and the cam shaft 3b, there is a seal member 15 which permits rotation of the cam shaft 3b. A dust cover 15 covers the adjusting gear 10, and is fixed to the back plate 1 by means of a screw 17. The dust cover 16 is fitted over the bottom plate 13. The bottom plate is restrained against rotation and dislodgement by an extension 13a formed partly thereon and an associated recession 16a formed partly in the dust cover 16. Between the dust cover 16 and the bottom plate 13, there is also a seal member 18.

The adjusting gear 10 is formed on its side facing the dust cover 16 with a spiral guide member 19 in the groove or rib form. In this embodiment, the guide member is in the groove form. A window 20 is formed in the dust cover 16 and along the axial direction of gear 10, and has a transparent member 21 fixed to its inside. Below the member 21, there is an indicator means 22 having a projection 22a which is slidably engageable with the guide member 19 of gear 10. The indicator means 22 includes a guide face 22b engaged with a cut-out in the window 20. The means 22 can thus be slid along a step 20b of window 20. The indicator means 22 is slidably moved from the inside to the outside of gear 10 within the window 20 in respose to the rotation of gear 10 caused by the abrasion of brake linings. That is to say, the abrasion of brake linings is determined by the amount of mevement of means 22, and the upper limit of wearing of brake linings is indicated by a point at which a marker 22c is in coincidence with an arrow 16 the dust cover 16 bears. Reference numeral 23 is a spring for holding the adjusting gear 10.

This embodiment operates in the same manner as explained in connection with the foregoing embodiments.

As the brake linings wear away, the adjusting gear 10 is rotated, so that the resilient pawl 12a of stopper 12 mates in sequence with the teeth of gear 10. Thus, a brake-gap is always kept constant in an automatic manner.

In response to the rotation of gear 10, the indicator means 22 is radially slid within the window 20 from the inside to the outside of gear 10. Therefore, a driver can visually monitor the amount of movement of means 22, and can easily be aware of the degree of abrasion of brake linings. From the fact that the marker 22c of means 22 coincides with the arrow 16a the dust cover 16 bears, the driver can also learn that the abrasion of brake linings reaches a critical value.

Figure 35:
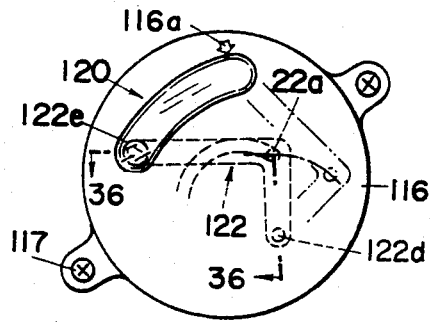
Figure 36:
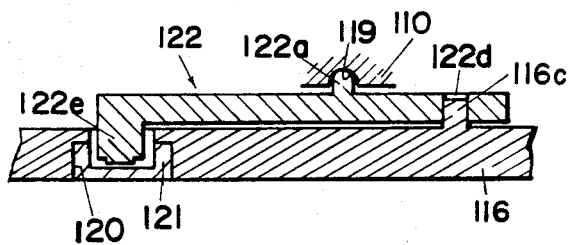

Another embodiment of the indicator means will now be explained with reference to FIGS. 35 and 36.

In this embodiment, the indicator means 122 is substantially in the L-shaped form. This means has in its one end an opening 122d into which a pivotal projection 116c is pivotally fitted, said projection being formed on a dust cover 116. The other end of means 122 serves as a marker 122e which is slidably fitted within a window 120 formed in part of the circumference of a dust cover 115. The corner of the L-shaped means has a projection 122a slidably engaged with a guide member 119 of an adjusting gear 110. When the adjusting gear 110 is rotated, the projection 122a of means 122 is moved along the guide member 119. Since the indicator means 122 is then turned around the pivotal projection 115c of cover 115, there is an increase in the stroke of movement of the marker 122e within the window 120, which makes visual monitoring easier.

While the transparent member 121 is fixed to the inside of window 120 in both embodiments, it is understood that an optical lens may be used in place of said member 121 so as to detect more clearly the position of the indicator means. More satisfactory monitoring is achieved by painting the marker 122 a clear color.

As mentioned above, these two embodiments permit extremely easy, visual detection of the degree of abrasion of brake linings, since the indicator means slidably engaged with the guide member of the adjusting gear is designed to move within the window in the cover in response to the amount of rotation of said gear. These embodiments have an advantage over the pivot art system designed to give an alarm when the abrasion of brake linings reaches a critical value, in that the time for replacement of brake shoes can be determined in advance. Further, these embodiments are simple in construction, and inexpensive to manufacture.

An amount of heat inevitably generated during braking is transmitted from the brake shoes 2, 2' to the back plate 1. However, such heat has only a little influence on the inventive arrangement, since the adjusting mechanism B is disposed outside of the back plate 1, and spaced far away from the brake shoes 2, 2. In addition, the back plate 1 and the mechanism A, bothe close to the adjusting mechanism B, are cooled by an amount of air that finds its way through the air passage D, whereby transmission of the heat to the mechanism B is effectively prevented. Accordingly, parts of the adjusting mechanism B, in particular, the adjusting gear 10 which may be formed of a material easy to deteriorate due to heat, such as synthetic resin, are not affected by such heat, thus assuring smooth and reliable adjusting operation. To add to this, entrance and deposition of water, sand, mud, etc. into and onto the adjusting mechanism B are completely prevented, since the mechanism B is tightly closed by the covering mechanism C including the cover 16 fixed to the back plate 1, the bottom plate 16 fitted over the cam shaft 3b and the like. Accordingly, there is no fear that the adjusting mechanism B may not work or operate unsatisfactorily due to such deposition. Moreover, generation of rust due to such deposition is also effectively prevented.

What is claimed is:

1. An automatic brake-gap adjuster system for mechanical drum brakes comprising a pair of brake shoes, each brake shoe having one end pivotally supported on a back plate and the other end adapted to move outwardly into engagement with the inner periphery of a brake drum; a cam member rotatably disposed through said back plate between said other ends of said pair of brake shoes and adapted to be rotated by a brake arm, said cam member comprising a cam portion having a pair of opposed flat sides and a tapered axial guide groove in each said side tapering from a shallower depth at the end proximate said back plate to a greater depth at the distal end thereof; cam collars slidably disposed in said guide grooves to abut onto said other ends of said brake shoes, whereby said cam collars are rotatable with said cam member, slidable toward a cam shaft and movable in the expanding direction of said brake shoes; an actuating member threaded into said cam member to abut onto the end faces of said collars; and an adjusting member adapted to rotate said actuating member in response to the abrasion of said brake shoes, thereby threadedly moving said actuating member toward said cam shaft; whereby said cam collars are slidingly moved toward said cam shaft along said tapered groove to thereby expand said brake shoes and adjust the brake-gap between the inner periphery of said brake drum and said brake shoes.

2. The system as recited in claim 1, in which the cam portion of said cam member is provided on both its sides with tapering guide concavity and convexity with which are engaged relative convexity and concavity formed on said cam collars.

3. The system as recited in claim 1, wherein said guide grooves are disposed at positions symmetrical about the center of said cam shaft, said cam collars to take abutment onto said other ends of said brake shoes are slidably fitted into said grooves in such a manner that they extend to move apart said brake shoes, said actuating member being threadedly moved by said adjusting mechanism to extend said cam collars in the expanding direction of said brake shoes.

4. The system as recited in claim 3, wherein said guide grooves into which said cam collars are fitted are inclined at a right angles with a line drawn by connecting the center of said cam shaft with the center of said brake drum during braking.

5. The system as recited in claim 3 or 4, further comprising a cam cover which includes a ceiling for covering the end of the cam portion of said cam member and the ends of said cam collars; and skirts formed with cut-outs for permitting movement of said cam collars in the expanding direction of said brake shoes, said skirts having a length within the stroke of adjustment; and said cover being mounted on the cam portion of said cam member in such a manner that it is slidable in response to threaded movement of said cam member, with its ceiling being interposed between the end of the cam portion and the head of said actuating member.

6. The system as recited in claim 1, in which said cam collars are formed of symmetrically polygonal plates each including shoe web-contacting surfaces and actuating member-contacting surfaces which intersect at right angles in symmetrical positions, the angle at which said shoe web-contact surfaces intersect being acute, while the angle at which said actuating member-contacting surfaces intersect being obtuse.

7. The system as recited in claim 1, in which said opposed flat sides have a length greater than the thickness of said other ends of said brake shoes in the axial direction, and in which the head of said actuating member is caused to abut upon the front end of said cam portion to place upon the movement of said actuating member a limitation which defines the critical value of brake-gap adjustment.

8. The system as recited in claim 1, in which said adjusting member comprises an adjusting gear inserted into said cam member and an adjusting lever mounted on a stationary member and adapted to mate with said adjusting gear to rotate said gear in the adjusting direction in response to the abrasion of said brake shoes.

9. The system as recited in claim 8, in which said adjusting lever is fitted over the cam shaft of said cam member so as to rotate said cam member, and has its end clamped on said back plate with a dust cover which covers said adjusting gear, and a resilient pawl is engaged with said adjusting gear in such a manner that it is rotatable in the adjusting direction.

10. The system as recited in claim 9, in which the cam shaft of said cam member is provided around its rear end with axially engaging portions, and a feed pawl means is inserted over said cam shaft, having therein an opening the edge of which is formed with pieces to be engaged with said axially engaging portions, said feed pawl means being formed around its outer edge with resilient pawls adapted to mate with said adjusting gear, thereby providing rotational feeding of said adjusting gear in the adjusting direction.

11. The system as recited in claim 9, in which said adjusting gear is formed with spiral guide means, said dust cover adapted to cover said adjusting gear is formed therein with a window, and an indicator means is slidably disposed within said window, the projection of said indicator means being slidably engaged with said spiral guide means, whereby said indicator means is slidable along said window in response to the rotation of said adjusting gear.

12. The system as recited in claim 8, wherein said adjusting gear is formed separately from said actuating member.

13. The system as recited in claim 8, wherein said adjusting gear is formed integrally with said actuating member.

14. An automatic brake-gap adjuster system for mechanical drum brakes, which comprises a pair of brake shoes disposed on the inside of a back plate with one end pivotally mounted on said back plate and the other end free to move; a mechanism for expansion of said brake shoes interposed between the free ends of said shoes and comprising a cam member rotatably inserted through said back plate, cam collars adapted to be slidable toward a cam shaft along said cam member and movable in the expanding direction of said brake shoes, and an actuating member threaded into said cam member and adapted to be moved toward said cam shaft to push said cam collars; an adjusting mechanism adapted to move said actuating member toward the end of said cam member extending out of said back plate in response to the abrasion of brake linings; and a covering mechanism adapted to close tightly said adjusting mechanism with an air passage between said back plate and adjusting mechanism.

* * * * *